(12) United States Patent
Whitaker et al.

(10) Patent No.: US 7,833,339 B2
(45) Date of Patent: Nov. 16, 2010

(54) MINERAL FILLER COMPOSITION

(75) Inventors: Robert H. Whitaker, Cleveland, GA (US); Allen E. Smith, Sparta, NJ (US); David R. Puryear, Nashville, TN (US)

(73) Assignee: Franklin Industrial Minerals, Nashville, TN (US)

( * ) Notice: Subject to any disclaimer, the term of this patent is extended or adjusted under 35 U.S.C. 154(b) by 1157 days.

(21) Appl. No.: 11/405,966

(22) Filed: Apr. 18, 2006

(65) Prior Publication Data

US 2007/0261337 A1 Nov. 15, 2007

(51) Int. Cl.
*C09D 195/00* (2006.01)
*C08L 95/00* (2006.01)
*C09C 1/02* (2006.01)
*D06N 5/00* (2006.01)
*E04D 3/18* (2006.01)
*B32B 11/02* (2006.01)

(52) U.S. Cl. .................... 106/284.01; 106/284.04; 106/284.06; 106/284.4; 106/465; 428/141; 428/144; 428/148; 428/330; 428/403; 428/407

(58) Field of Classification Search ............ 427/186
See application file for complete search history.

(56) References Cited

U.S. PATENT DOCUMENTS

| | | | |
|---|---|---|---|
| 2,191,295 A * | 2/1940 | Dohse et al. ............ 106/277 |
| 2,276,155 A | 3/1942 | Carr | |
| 2,317,150 A | 4/1943 | Lovell | |
| 2,469,728 A | 5/1949 | Holmes | |
| 2,582,823 A | 1/1952 | Fowkes | |
| 2,582,824 A | 1/1952 | Fowkes | |
| 2,767,102 A | 10/1956 | Edson | |
| 2,860,067 A * | 11/1958 | Crews et al. ............ 106/269 |
| 3,462,359 A | 8/1969 | Fauber | |
| 3,601,376 A | 8/1971 | Niemitz | |
| 3,607,334 A | 9/1971 | Fauber | |
| 3,615,329 A | 10/1971 | Jones | |
| 3,617,329 A | 11/1971 | Goff | |
| 3,617,560 A | 11/1971 | Deul | |
| 3,650,786 A | 3/1972 | Maravilla | |
| 3,663,281 A * | 5/1972 | Fauber ............ 106/279 |
| 3,696,665 A | 10/1972 | Poppe | |
| 3,707,388 A | 12/1972 | Kinnaird, Jr. | |
| 3,722,867 A | 3/1973 | Butler | |
| 3,772,857 A | 11/1973 | Jackson | |
| 3,848,384 A | 11/1974 | Eaton | |
| 3,874,444 A | 4/1975 | Perce | |
| 3,877,454 A | 4/1975 | Axmann | |
| 3,881,708 A | 5/1975 | Carle | |

(Continued)

OTHER PUBLICATIONS

Guertin, Mike, "Roofing with Asphalt Shingles," 2002 (No month) The Taunton Press, Inc., pp. 7.*

(Continued)

*Primary Examiner*—David R Sample
*Assistant Examiner*—Nathan E Comstock
(74) *Attorney, Agent, or Firm*—Howard J. Greenwald

(57) ABSTRACT

A composition comprised of asphalt and filler, wherein said filler is comprised of particles that comprise an inorganic core and a coating disposed on said core, and wherein at least about 60 weight percent of said particles are smaller than about 212 microns.

4 Claims, 5 Drawing Sheets

U.S. PATENT DOCUMENTS

| | | |
|---|---|---|
| 3,900,434 A | 8/1975 | Bruschtein |
| 3,919,163 A | 11/1975 | Clendinning |
| 3,921,358 A | 11/1975 | Bettoli |
| 3,931,440 A | 1/1976 | Shepherd |
| 3,938,469 A | 2/1976 | Nau |
| 3,962,072 A | 6/1976 | Ramacher |
| 3,980,448 A | 9/1976 | Haemmerle |
| 3,995,079 A | 11/1976 | Haas, Jr. |
| 4,015,973 A | 4/1977 | Perrine |
| 4,026,763 A | 5/1977 | Poindexter |
| 4,038,102 A | 7/1977 | Hellsten |
| 4,043,817 A | 8/1977 | Okutsu |
| 4,052,290 A | 10/1977 | Cushman |
| 4,094,697 A * | 6/1978 | Rostler ................. 106/280 |
| 4,101,429 A | 7/1978 | Birke |
| 4,128,438 A | 12/1978 | Wolff |
| 4,174,974 A | 11/1979 | Fondriest |
| 4,180,466 A | 12/1979 | Newingham |
| 4,190,568 A | 2/1980 | Haney |
| 4,231,884 A | 11/1980 | Dorius |
| 4,237,025 A | 12/1980 | Tadros |
| 4,239,736 A | 12/1980 | Fenske |
| 4,269,450 A | 5/1981 | Welborn |
| 4,272,498 A | 6/1981 | Faatz |
| 4,273,685 A | 6/1981 | Marzocchi |
| 4,274,243 A | 6/1981 | Corbin |
| 4,276,661 A | 7/1981 | Baker |
| 4,280,949 A | 7/1981 | Dieck |
| 4,288,162 A | 9/1981 | Sakamoto |
| 4,301,851 A | 11/1981 | Gitkin |
| 4,316,813 A | 2/1982 | Voss |
| 4,316,829 A | 2/1982 | Roberts |
| 4,322,928 A | 4/1982 | Freiborg |
| 4,324,453 A | 4/1982 | Patel |
| 4,328,147 A | 5/1982 | Chang |
| 4,332,705 A | 6/1982 | Uffner |
| 4,335,186 A | 6/1982 | Marzocchi |
| 4,338,231 A | 7/1982 | Marzocchi |
| 4,338,288 A | 7/1982 | Rollmann |
| 4,349,388 A | 9/1982 | Marzocchi |
| 4,356,572 A | 11/1982 | Guillemin |
| 4,358,415 A | 11/1982 | Tachimoto |
| 4,359,505 A | 11/1982 | Joedicke |
| 4,372,814 A | 2/1983 | Johnstone |
| 4,374,168 A | 2/1983 | Wojtowicz |
| 4,374,645 A | 2/1983 | Monteyne |
| 4,378,408 A | 3/1983 | Joedicke |
| 4,378,447 A | 3/1983 | Grossi |
| 4,382,989 A | 5/1983 | Chang |
| 4,384,073 A | 5/1983 | Grossi |
| 4,384,074 A | 5/1983 | Grossi |
| 4,390,349 A | 6/1983 | Jen-Tung |
| 4,392,371 A | 7/1983 | Okumura |
| 4,394,481 A | 7/1983 | Grossi |
| 4,394,482 A | 7/1983 | Uffner |
| 4,404,316 A | 9/1983 | Marzocchi |
| 4,420,341 A * | 12/1983 | Ferrigno ................. 106/457 |
| 4,421,678 A | 12/1983 | Mehta |
| 4,428,850 A | 1/1984 | Zoleski |
| 4,430,127 A | 2/1984 | Dalter |
| 4,430,281 A | 2/1984 | Boylan |
| 4,430,465 A | 2/1984 | Abbott |
| 4,441,887 A | 4/1984 | Funk |
| 4,447,269 A | 5/1984 | Schreuders |
| 4,452,961 A | 6/1984 | Koerner |
| 4,462,840 A | 7/1984 | Schilling |
| 4,468,232 A | 8/1984 | Funk |
| 4,468,430 A | 8/1984 | Ruede |
| 4,470,877 A | 9/1984 | Johnstone |
| 4,472,243 A | 9/1984 | Bondoc |
| 4,477,259 A | 10/1984 | Funk |
| 4,477,260 A | 10/1984 | Funk |
| 4,479,806 A | 10/1984 | Funk |
| 4,486,476 A | 12/1984 | Fritsch |
| 4,487,879 A | 12/1984 | Needham |
| 4,501,205 A | 2/1985 | Funk |
| 4,510,062 A | 4/1985 | Nakanishi |
| 4,511,411 A | 4/1985 | Brunner |
| 4,513,818 A | 4/1985 | Michels |
| 4,526,584 A | 7/1985 | Funk |
| 4,537,595 A | 8/1985 | Gruning |
| 4,548,650 A | 10/1985 | Kietzman |
| 4,554,245 A | 11/1985 | Hayashi |
| 4,560,414 A | 12/1985 | Kikegawa |
| 4,569,389 A | 2/1986 | Graham, Jr. |
| 4,576,638 A | 3/1986 | Doerr |
| 4,588,634 A | 5/1986 | Pagen |
| 4,594,236 A | 6/1986 | Eriksson |
| 4,614,755 A | 9/1986 | Rodgers |
| 4,629,130 A | 12/1986 | Veltman |
| 4,629,506 A | 12/1986 | Ulrich |
| 4,634,622 A | 1/1987 | Jenkins |
| 4,650,496 A | 3/1987 | Funk |
| 4,656,122 A | 4/1987 | Sowinski |
| 4,659,381 A | 4/1987 | Walters |
| 4,659,389 A | 4/1987 | Wombles |
| 4,661,164 A | 4/1987 | Severinghaus, Jr. |
| 4,662,915 A | 5/1987 | Shirai |
| 4,671,208 A | 6/1987 | Smith |
| 4,676,917 A | 6/1987 | Sung |
| 4,677,146 A | 6/1987 | Senz |
| 4,688,938 A | 8/1987 | Demoulin |
| 4,694,051 A | 9/1987 | Kordomenos |
| 4,710,226 A | 12/1987 | Mallow |
| 4,717,614 A | 1/1988 | Bondoc |
| 4,720,350 A | 1/1988 | Zoleski |
| 4,721,159 A | 1/1988 | Ohkochi |
| 4,721,529 A | 1/1988 | Mullins |
| 4,736,311 A | 4/1988 | Takeuchi |
| 4,742,718 A | 5/1988 | Jimbo |
| 4,758,260 A | 7/1988 | Geropp |
| 4,780,109 A | 10/1988 | Malone |
| 4,781,759 A | 11/1988 | Smith |
| 4,781,846 A | 11/1988 | Kanamori |
| 4,781,950 A | 11/1988 | Giesing |
| 4,793,939 A | 12/1988 | Mori |
| 4,804,696 A | 2/1989 | Jolitz |
| 4,806,166 A | 2/1989 | Schilling |
| 4,812,427 A | 3/1989 | Kohut |
| 4,812,428 A | 3/1989 | Kohut |
| 4,817,358 A | 4/1989 | Lincoln |
| 4,818,117 A | 4/1989 | Krambrock |
| 4,824,559 A | 4/1989 | Gilmore |
| 4,824,653 A | 4/1989 | Severinghaus, Jr. |
| 4,833,184 A | 5/1989 | Higgins |
| 4,839,404 A | 6/1989 | Chang |
| 4,839,412 A | 6/1989 | Harrell |
| 4,850,844 A | 7/1989 | Hunting |
| 4,851,463 A | 7/1989 | Opsahl |
| 4,868,233 A | 9/1989 | Moran |
| 4,876,291 A | 10/1989 | Dallavia, Jr. |
| 4,880,759 A | 11/1989 | Kohut |
| 4,895,754 A | 1/1990 | Graham |
| 4,900,589 A | 2/1990 | Montgomery |
| 4,909,837 A | 3/1990 | Hansen |
| 4,933,384 A | 6/1990 | Wolfe |
| 4,952,268 A | 8/1990 | Beck |
| 4,971,615 A | 11/1990 | Manz |
| 4,975,476 A | 12/1990 | Wolfe |
| 5,019,610 A | 5/1991 | Sitz |
| 5,026,747 A | 6/1991 | Jolitz |
| 5,059,300 A | 10/1991 | McGinnis |
| 5,064,571 A | 11/1991 | Speranza |
| 5,080,484 A | 1/1992 | Schneider |

| | | | | | | |
|---|---|---|---|---|---|---|
| 5,094,532 A | 3/1992 | Trainer | | 5,678,235 A | 10/1997 | Crowe |
| 5,095,055 A | 3/1992 | Moran | | 5,681,361 A | 10/1997 | Sanders, Jr. |
| 5,100,715 A | 3/1992 | Zimmerman | | 5,682,235 A | 10/1997 | Igushi |
| 5,102,463 A | 4/1992 | Jolitz | | 5,712,033 A | 1/1998 | Gallagher |
| 5,110,674 A | 5/1992 | Grube | | 5,712,039 A | 1/1998 | Marhevka |
| 5,127,963 A | 7/1992 | Hartup | | 5,746,830 A | 5/1998 | Burton |
| 5,164,787 A | 11/1992 | Igushi | | 5,755,865 A | 5/1998 | Lukens |
| 5,168,817 A | 12/1992 | Nulle | | 5,766,333 A | 6/1998 | Lukens |
| 5,174,581 A | 12/1992 | Goodson | | 5,776,541 A | 7/1998 | Belt |
| 5,185,641 A | 2/1993 | Igushi | | 5,788,727 A | 8/1998 | Barthelmess |
| 5,193,936 A | 3/1993 | Pal | | 5,795,622 A | 8/1998 | Belt |
| 5,196,620 A | 3/1993 | Gustin | | 5,806,908 A | 9/1998 | Kim |
| 5,211,895 A | 5/1993 | Jacklich, Sr. | | 5,822,943 A | 10/1998 | Frankoski |
| 5,217,530 A | 6/1993 | Grzybowski | | 5,851,276 A | 12/1998 | Memon |
| 5,228,895 A | 7/1993 | Kelly | | 5,851,933 A * | 12/1998 | Swartz et al. ............... 442/180 |
| 5,240,760 A | 8/1993 | George | | 5,859,306 A | 1/1999 | Stanforth |
| 5,244,481 A | 9/1993 | Nied | | 5,860,908 A | 1/1999 | Forrester |
| 5,245,114 A | 9/1993 | Forrester | | 5,861,946 A | 1/1999 | Hudson |
| 5,252,003 A | 10/1993 | McGahan | | 5,866,211 A | 2/1999 | Aoyama |
| 5,256,710 A | 10/1993 | Krivohlavek | | 5,877,393 A | 3/1999 | Webster |
| 5,276,106 A | 1/1994 | Portelli | | 5,891,224 A | 4/1999 | Aoyama |
| 5,278,982 A | 1/1994 | Daniels | | 5,897,685 A | 4/1999 | Goozner |
| 5,290,355 A | 3/1994 | Jakel | | 5,898,093 A | 4/1999 | Vos |
| 5,316,313 A | 5/1994 | Moore | | 5,908,502 A | 6/1999 | Cangiano |
| 5,317,521 A | 5/1994 | Lin | | 5,943,231 A | 8/1999 | Thomas |
| 5,331,028 A | 7/1994 | Goodrich | | 5,965,638 A | 10/1999 | Heine |
| 5,337,824 A | 8/1994 | Cowan | | 5,968,952 A | 10/1999 | Venet |
| 5,341,939 A | 8/1994 | Aitchison | | 5,973,037 A | 10/1999 | Fields |
| 5,352,275 A | 10/1994 | Nath | | 5,990,206 A | 11/1999 | Tanaka |
| 5,356,664 A | 10/1994 | Narayan | | 5,993,530 A | 11/1999 | Tanaka |
| 5,364,894 A | 11/1994 | Portfolio | | 6,001,185 A | 12/1999 | Huff |
| 5,368,922 A | 11/1994 | Portelli | | 6,004,900 A | 12/1999 | O'Brien, III |
| 5,375,779 A | 12/1994 | Ephraim | | 6,007,590 A | 12/1999 | Sanders, Jr. |
| 5,380,552 A | 1/1995 | George | | 6,029,395 A | 2/2000 | Morgan |
| 5,382,449 A | 1/1995 | Hedges | | 6,053,967 A | 4/2000 | Heilmann |
| 5,393,819 A | 2/1995 | Peters | | 6,063,447 A | 5/2000 | Morand |
| 5,397,478 A | 3/1995 | Pal | | 6,093,494 A | 7/2000 | Schulz |
| 5,399,598 A | 3/1995 | Peters | | 6,095,082 A | 8/2000 | Belt |
| 5,405,648 A | 4/1995 | Hermann | | 6,109,913 A | 8/2000 | Young |
| 5,405,686 A | 4/1995 | Portelli | | 6,120,756 A | 9/2000 | Markowitz |
| 5,411,803 A | 5/1995 | George | | 6,150,439 A | 11/2000 | Keiichi |
| 5,421,906 A | 6/1995 | Borah | | 6,177,499 B1 | 1/2001 | Minghetti |
| 5,423,218 A | 6/1995 | Matsuzaki | | 6,191,853 B1 | 2/2001 | Yamaguchi |
| 5,427,793 A | 6/1995 | Bigham | | 6,228,785 B1 | 5/2001 | Miller |
| 5,430,223 A | 7/1995 | Bauer | | 6,245,723 B1 | 6/2001 | Sigg |
| 5,430,234 A | 7/1995 | Willis | | 6,252,658 B1 | 6/2001 | Togawa |
| 5,431,939 A | 7/1995 | Cox | | 6,258,456 B1 | 7/2001 | Meyer |
| 5,439,056 A | 8/1995 | Cowan | | 6,281,972 B1 | 8/2001 | Ebara |
| 5,443,632 A | 8/1995 | Schilling | | 6,351,676 B1 | 2/2002 | Thomas |
| 5,451,621 A | 9/1995 | Usmani | | 6,358,305 B1 | 3/2002 | Joedicke |
| 5,460,741 A | 10/1995 | Hata | | 6,358,319 B1 | 3/2002 | Huykman |
| 5,460,852 A | 10/1995 | Janicki | | 6,383,398 B2 | 5/2002 | Amer |
| 5,462,996 A | 10/1995 | Portelli | | 6,391,373 B1 | 5/2002 | Kaiser |
| 5,494,953 A | 2/1996 | Rigosi | | 6,403,687 B1 | 6/2002 | Schulz |
| 5,511,899 A | 4/1996 | Pavelek, II | | 6,444,731 B1 | 9/2002 | Memon |
| 5,516,573 A | 5/1996 | George | | 6,465,058 B2 | 10/2002 | Huykman |
| 5,541,831 A | 7/1996 | Thomas | | 6,474,028 B2 | 11/2002 | Cusimano |
| 5,545,681 A | 8/1996 | Honkonen | | 6,482,780 B2 | 11/2002 | Yokouchi |
| 5,547,596 A | 8/1996 | Omiya | | 6,503,968 B1 | 1/2003 | Kim |
| 5,558,702 A | 9/1996 | Chatterjee | | 6,544,911 B2 | 4/2003 | Peng |
| 5,566,576 A | 10/1996 | Sher | | 6,547,948 B1 | 4/2003 | Soppe |
| 5,571,596 A | 11/1996 | Johnson | | 6,562,119 B2 | 5/2003 | Jones, IV |
| 5,573,331 A | 11/1996 | Lin | | 6,569,925 B2 | 5/2003 | Baumgardner |
| 5,578,771 A | 11/1996 | Karhu | | 6,573,340 B1 | 6/2003 | Khemani |
| 5,603,758 A * | 2/1997 | Schreifels et al. ........... 106/677 | | 6,576,584 B1 | 6/2003 | Iijima |
| 5,620,893 A | 4/1997 | Hogen | | 6,590,133 B2 | 7/2003 | Stanforth |
| 5,648,407 A | 7/1997 | Goetz | | 6,616,755 B1 | 9/2003 | Levy |
| 5,651,550 A | 7/1997 | LaVorgna | | 6,637,354 B2 | 10/2003 | Ramme |
| 5,658,886 A | 8/1997 | Chizhov | | 6,642,302 B2 | 11/2003 | Wamprecht |
| 5,660,014 A | 8/1997 | Stahl | | 6,664,479 B2 | 12/2003 | Tanabe |
| 5,660,498 A | 8/1997 | Freeman | | 6,688,811 B2 | 2/2004 | Forrester |
| 5,667,577 A | 9/1997 | Chatterjee | | 6,695,902 B2 * | 2/2004 | Hemmings et al. ...... 106/284.05 |
| 5,676,729 A | 10/1997 | Elrod | | 6,706,148 B1 | 3/2004 | Joisson |

| | | |
|---|---|---|
| 6,713,539 B2 | 3/2004 | Guo |
| 6,717,363 B2 | 4/2004 | Foust |
| 6,736,991 B1 | 5/2004 | Cohen |
| 6,737,369 B2 | 5/2004 | Peng |
| 6,781,302 B2 | 8/2004 | Sigai |
| 6,786,963 B2 | 9/2004 | Matherly |
| 6,803,016 B2 | 10/2004 | Edlinger |
| 6,818,687 B2 | 11/2004 | Memon |
| 6,864,979 B2 | 3/2005 | Yamaguchi |
| 6,875,341 B1 | 4/2005 | Bunger |
| 6,875,342 B2 | 4/2005 | Shane |
| 6,884,431 B1 | 4/2005 | Nabel |
| 6,890,872 B2 | 5/2005 | Bond |
| 6,895,724 B2 | 5/2005 | Naipawer, III |
| 6,916,505 B2 | 7/2005 | Raymond |
| 6,926,669 B1 | 8/2005 | Stewart |
| 2004/0176502 A1 * | 9/2004 | Raymond et al. ............ 523/416 |
| 2005/0130519 A1 | 6/2005 | Rodrigues |

OTHER PUBLICATIONS

Particle Size—US Sieve Series and Tyler Mesh Size Equivalents, accessed at www.azom.com/details.asp?ArticleID=1417, accesed on Sep. 28, 2009.*

Hicks, Russell G. et. al., Moisture Damage in Asphalt Concrete, 1991 (no month), Transportation Research Board, illustrated ed., pp. 4-5.*

* cited by examiner

MINERAL FILLER COMPOSITION

FIELD OF THE INVENTION

A composition comprised of asphalt and filler, wherein said filler is comprised of particles that comprise an inorganic core and a coating disposed on said core, and wherein at least about 60 weight percent of said particles are smaller than about 212 microns.

BACKGROUND OF THE INVENTION

Asphalt shingles are made by a process in which asphalt is mixed with inorganic filler material to make a filled asphalt coating, and the filled asphalt coating thus produced is used to saturate and coat a glass fabric mat. In this process, it is desired that the viscosity of the asphalt/filler material be sufficiently low so as to allow efficient processing at relatively high production rates.

The viscosity of the filled asphalt coating used in this process can often be a limiting factor in achieving complete saturation of the glass fabric. Such viscosity is typically a function of, e.g., the type of asphalt used, the level of inorganic filler in the asphalt coating, the type of inorganic filler used, and the temperature of the filled asphalt coating.

As the viscosity of the filled asphalt coating increases above certain ranges, the glass fabric mat may not be fully saturated, and thin or uncoated spots, bubbles or voids may be created which may lead to premature failure of the roofing shingle.

When the viscosity of the filled asphalt coating increases to unacceptable levels, the roofing shingle manufacturer must compensate for this increased viscosity by, reducing the "process line speed" and/or increasing the temperature of the filled asphalt coating and/or reducing the amount of filler in the asphalt/filler composition.

The problem with decreasing the "process line speed" is that it results in decreased productivity.

The problem with increasing the temperature of the filled asphalt coating is described, e.g., in U.S. Pat. No. 4,634,622, the entire disclosure of which is hereby incorporated by reference into this specification. This patent discloses that "Because asphalt is more expensive than the conventional filler material, the use of less asphalt overall, without reducing the amount of filler, has been tried by others. The result has been a cheaper roofing product, but one which cannot weather to the same level as product with more of the same quality asphalt. Further, a significant reduction in asphalt can create processing problems. The more the amount of asphalt in a given mix is reduced, the higher the concentration of filler in the mix. This increases the viscosity of the mix and could cause flow problems through the processing conditions. One way to combat this is to heat the asphalt or the filler or both, since the addition of heat will lower the viscosity. The addition of heat over and above the standard processing temperatures, however, would move the temperature of the asphalt closer to its flashpoint."

The problem with reducing the amount of filler in the asphalt/filler composition is that, as is indicated in such U.S. Pat. No. 4,634,622, " . . . asphalt is more expensive than the conventional filler material . . . . "

It is an object of this invention to provide a filled asphalt coating composition that can be used to efficiently produce good roofing shingles that are relatively inexpensive and have good mechanical and other properties.

SUMMARY OF THE INVENTION

In accordance with this invention, there is provided a composition comprised of asphalt and filler, wherein said filler is comprised of particles that comprise an inorganic core and a coating deposited on said core, and wherein at least about 60 weight percent of said particles are smaller than about 212 microns.

BRIEF DESCRIPTION OF THE DRAWINGS

The invention will be described by reference to the following drawings, in which like numerals refer to like elements, and wherein.

DESCRIPTION OF THE PREFERRED EMBODIMENTS

Figure 1:
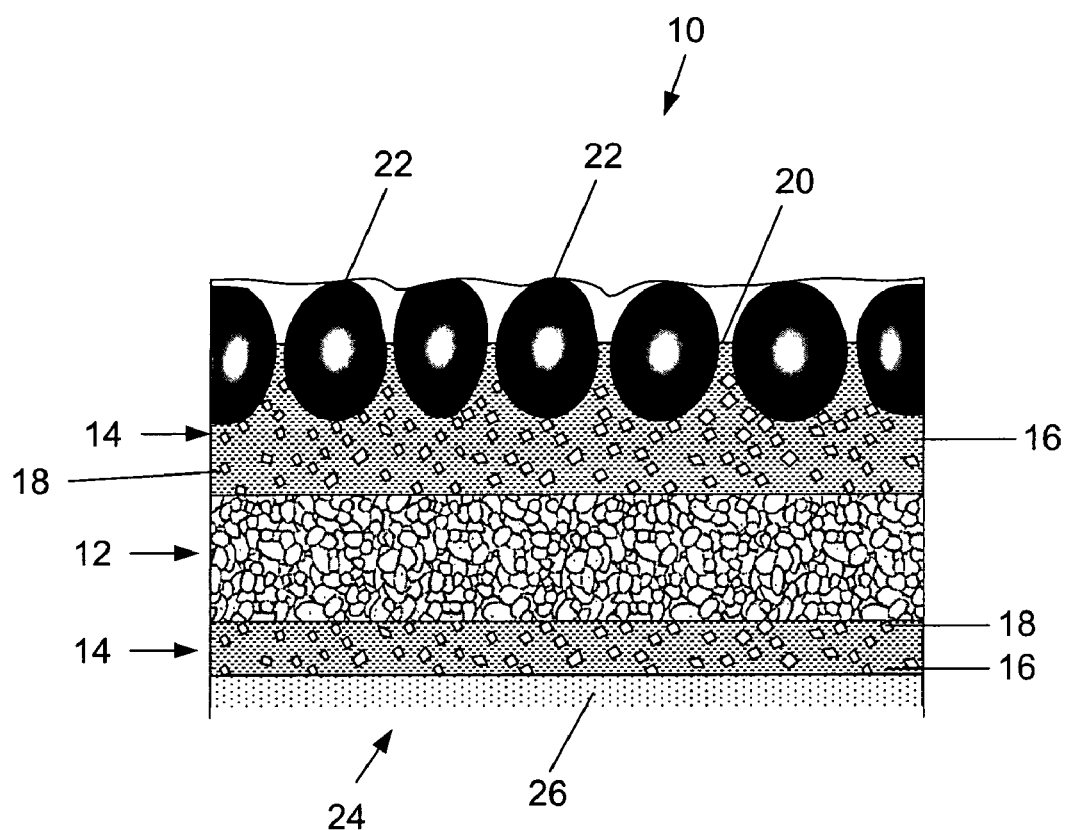
FIG. 1 is a sectional view of a typical fiberglass shingle.

In one embodiment of this invention, a filler composition is provided that, when mixed with asphalt, produces a filled asphalt coating with a viscosity that is about ten percent lower than filled asphalt compositions produced with conventional fillers. This embodiment of the invention provides those in the shingle manufacturing art an opportunity to increase roofing production line speed by at least five percent. Without wishing to be bound to any particular theory, and with regard to processes for making roofing shingles, applicants believe that this improvement is due to the improved ability of applicants' filler composition to more rapidly saturate and coat the glass fabric commonly used in the production of roofing shingles.

An asphalt roofing shingle, constructed in the conventional manner, typically utilizes a petroleum based roofing asphalt which has been oxidized by blowing with air at a temperature of approximately 500 degrees Fahrenheit, to a final Ring & Ball Softening Point of between 195 degrees Fahrenheit and 215 degrees Fahrenheit. Such a softening point can be determined by ASTM standard test D 36.

The aforementioned petroleum based roofing asphalt which has been oxidized, typically has a "Needle Penetration" of between 16 decimillimeters and 23 decimillimeters (at 77 degrees Fahrenheit). Such "Needle Penetration" can be determined by ASTM standard test D 5.

The aforementioned petroleum based roofing asphalt which has been oxidized is typically referred to in the trade as "asphalt shingle coating;" and it is often combined with a commercial filler and thereafter applied to a commercially available glass roofing fabric.

By way of illustration and not limitation, one may use a commercially available bonded non-woven glass roofing fabric with a dry weight of approximately 92-95 grams/square meter, consisting of chemically sized individual "E" Glass filaments of 15.25-16.5 microns in diameter ("M" fiber) and from 0.75-1.25 inches in length, which are randomly oriented and bonded with a modified urea-formaldehyde resin binder, which has been applied to a level of 20 percent (dry weight). The fabric is often referred to in the art as a "glass roofing mat."

The aforementioned glass roofing mat is typically coated on each side and saturated with a roofing asphalt compound consisting of the aforementioned asphalt shingle coating that preferably contains at least 65 percent of a mineral filler such as limestone or stone dust; such a composition is typically referred to in the trade as a "filled asphalt coating." In one preferred embodiment of the present invention, the mineral filler used is a coated mineral filler of a certain particle size.

The filled asphalt coating typically has a viscosity of between 2000 centipoise and 4500 centipoise when applied to the glass roofing mat at a temperature of between 425 degrees Fahrenheit and 475 degrees Fahrenheit. Such viscosity can be determined by ASTM standard test D 4402. It is preferred to utilize a process line speed that assures complete saturation of the glass roofing mat.

The fully saturated glass roofing mat may be referred to as "the warm sheet." Roofing granules are typically applied to the top surface of the warm sheet by gravity feed, and the granules are roll pressed into the sheet with a roll pressure of between 10 pounds per square inch and 15 pounds per square inch. The finished sheet is allowed to cool to room temperature, and then it is cut into various patterns representing the types of shingles to be sold.

The use of this embodiment of applicants' invention allows manufacturers of roofing shingles substantially more flexibility in modifying their processes than was allowed with prior art filled asphalt coatings.

Thus, e.g., the roofing manufacturer can reduce the viscosity of the filled asphalt coating and thereby create the opportunity for compensatory adjustments in the manufacturing process to be made, specifically, increased line speed because of the improved ability to saturate the glass fabric more effectively.

Thus, e.g., the manufacturer may reduce the operating temperature required to process the filled asphalt coating and thus reduce the amount of energy consumed by the process. In these days of increased energy costs, this is a substantial advantage. Without wishing to be bound to any particular theory, applicants believe that the use of applicants' preferred filler compositions produces filled asphalt coatings with reduced viscosity and thus provides the opportunity to reduce the filled asphalt coating process temperature by at least 5 degrees Fahrenheit while maintaining the same viscosity experienced with prior art filled asphalt compositions.

The production of asphalt roofing shingles is an energy intensive process. The filled asphalt coating typically used in the manufacture of roofing shingles typically has a viscosity of between 2000 centipoise and 4500 centipoise and is applied to the glass fabric at a temperature of between 425 degrees Fahrenheit and 475 degrees Fahrenheit, at a particular process line speed, to assure complete saturation of the glass roofing mat. One can modify a conventional prior art process with applicants' composition by either reducing the viscosity of the filled asphalt coating and/or reducing the coating temperature used to apply said coating to the glass roofing mat.

Alternatively, when the viscosity of the filled asphalt coating increases, the roofing manufacturer may maintain the line speed but increase the process temperature. This alternative, although effective, requires more energy and this increases the cost of producing the roofing shingles. Furthermore, the use of a higher process temperature often necessitates the use of asphalts with higher flash points; these asphalts are relatively expensive.

Applicants' composition allows one to run a manufacturing process at lower coating temperatures and, thus, allows one to utilize lower quality asphalts and/or asphalts with lower flash points, thus affording the roofing manufacturer substantially more flexibility in securing acceptable and lower cost asphalts.

With prior art shingle manufacturing processes, and in order to avoid risk of a fire in the oxidation and roofing process, the petroleum based asphalt selected to be used to produce the asphalt shingle coating typically has a flash point of at least 550 degrees Fahrenheit. In one embodiment, with the use of applicants' composition, the asphalt used in such composition can have a flash point as low as 540 degrees Fahrenheit and, more preferably, as low as 530 degrees Fahrenheit.

The use of applicants' composition allows one to increase the "filler loading" in the filled asphalt coating. The inorganic filler used in such compositions is typically much cheaper than the asphalt component; and an increase in the "filler loading" with a concomitant decrease in the "asphalt loading" substantially reduces the cost of producing such filled asphalt coating while not adversely affecting the properties of the roofing shingles made from such coating.

The Manufacture of Asphalt Shingles with Reduced Asphalt Contents.

The manufacture of asphalt shingles is well described in the patent literature. Reference may be had, e.g., to U.S. Pat. Nos. 4,269,450 (asphalt shingle remover), 4,468,430 (asphalt shingle with glass fiber mat), 4,817,358 (asphalt shingle with foamed asphalt layer u tabs), 6,895,724 (laminated hip and ridge asphalt shingle), and 6,926,669 (methods and apparatus for recycling asphalt single materials). The entire disclosure of each of these United States patents is hereby incorporated by reference into this specification.

U.S. Pat. No. 4,328,147, the entire disclosure of which is hereby incorporated by reference into this specification, describes the "roofing felt" onto which the filled asphalt composition is applied. Such patent discloses that "Roofing felt from a continuous roll is coated with the asphalt formulation at about 400° F. Roofing granules, a colored ceramic stone baked onto stone granules, are pressed into the coating. The shingle color becomes the color of the granules. This coated felt roll is cooled and the shingles, with desired cut-outs, are continuously cut from the continuous shingle roll. Typically, the roll is three feet wide and shingles are one by three feet with cut-outs."

U.S. Pat. No. 4,328,147 also discloses that "In recent years roofing felt material has been changed from cellulose to glass fibers. The new glass fiber shingle is thinner and more flexible than the old cellulose felt shingle. Therefore, the coating must have better flexibility properties, particularly at cold temperatures. If this is not the case, flexing at cold temperatures causes surface cracking in the shingles. The cracks are failure sites and points for future leaks to develop."

"ASTM International" (of 100 Barr Harbor Drive, P.O. Box C700, West Conshohocken, Pa. 19428) has developed a "Standard Specification for Asphalt Shingles Made from Glass Felt and Surfaced with Mineral Granules," D 3462-05. This standard has been widely accepted in the roofing industry as an authoritative criterion for the acceptability of fiberglass shingles.

Section 6 of ASTM D 3462-05 deals with "Dimensions, Masses and Permissible Variations." Section 6.3 of this standard specifies that "The shingles shall confirm to the masses prescribed in Table 2."

Table 2 of ASTM D 3462-05 appears on page 3 of such Standard, and it is entitled "Masses of Asphalt Shingles Made from Glass Felt." In the last two lines of such table, it is specified that "Mass percent of mineral matter passing a No. 70 (212-μm) sieve based on the total asphalt and mineral matter passing the No. 70 (212-μm) sieve" shall be no greater than 70 percent."

The specification that the shingle contain no more than about 70 weight percent of mineral filler with a particle size less than 212 microns was developed because of a belief that shingles containing more than this much "fine filler" would crack prematurely and/or fail the tear standard set forth in ASTM standard test D 3462-05 (and its predecessor ASTM standard test D 3462-03). As a result of this specification, and the widespread belief that asphalt shingles containing more than 70 weight percent of "fine filler" are unacceptable, many shingle manufacturers continue to make shingles comprised of from about 65 to about 69 weight percent of fine filler and from about 35 to about 31 weight percent of asphalt.

There is a widespread belief in the roofing industry that "excess mineral filler" with a particle size less than about 212 microns tends to remove essential oils from the asphalt in the roofing product and, consequently, cause cracking and premature failure of the shingle. This proposed failure mechanism is believed to be similar to the mechanism by which roofing shingles are believed to fail due to exposure to the sun. The asphalt component of roofing shingles degrades when subjected to heat, thereby releasing essential oils and weakening the bond between the asphalt and the roofing granules. As is disclosed on pages 7-8 of Mike Guertin's "Roofing with Asphalt Shingles" (The Taunton Press, Inc., Newtown, Conn., 2002), "All roof shingles will eventually degrade and fail. Except in cases of extreme weather conditions or events, the longevity of a roof is directly related to the quality of the asphalt and the strength of the heat from the sun. Heat robs asphalt of its oil, causing the shingle to become brittle. Brittle shingles crack and lose their protective granule surface coating, and the degradation process accelerates. When shingles lose patches of their granular surfacing, called spalling or blistering, the countdown to replacement should quicken. The exposed asphalt coating will deteriorate even more rapidly and precipitate further granule loss, which quickly leads to leaks."

Even with "fine mineral filler" compositions less than about 70 percent, many of the asphalt shingles made today fail prior to the time their warranty period expires. Thus, e.g., many shingles that are warranted for 20, 30, or even 40 years fail after no more than about 15 years of use.

It is an object of one embodiment of this invention to make a roofing shingle that has durable mechanical properties and will maintain sufficient mechanical properties for a substantial period of time.

It is another object of this embodiment of the invention to provide a roofing composition that, when made into a roofing shingle by a specified process, will produce a shingle that has durable mechanical properties and that will maintain these properties sufficiently for a substantial period of time.

It is yet another object of this embodiment invention to provide a mineral filler composition that, when mixed with a specified amount of asphalt, will produce a roofing composition that, when made into a roofing shingle by a specified process, will produce a shingle that has durable mechanical properties and that will maintain these properties sufficiently for a substantial period of time.

In accordance with this embodiment of the invention, there is provided a composition comprised of 71 to 75 weight percent of mineral filler material with a particle size less than 212 microns and 25 to about 29 weight percent of asphalt. When the composition is incorporated into a glass felt mat with a density of from about 1.8 to about 1.9 pounds per 100 square feet and made into a single-layer roofing shingle, the shingle, after having been subjected to at least 10 cycles of Cycle A of ASTM standard test D 4798-04, has a tear resistance of at least 1,700 grams.

In the remainder of this specification, several different embodiments of applicant's inventions will be described. The first such embodiment involves the preparation of novel headlap granules and compositions made therefrom. The second such embodiment involves the preparation of an asphaltic composition with relatively high loadings of fine mineral filler. The third such embodiment involves the preparation of an asphaltic composition that, at given coating temperature, has a lower viscosity than prior art asphaltic compositions.

A typical roofing shingle 10, that it is the subject of much of the disclosure of this case, is depicted in FIG. 1. FIG. 1 is a schematic sectional view of a typical roofing shingle 10. This shingle 10 is preferably constructed in layers, each serving a particular function.

Referring to FIG. 1, the backbone of the shingle 10 is base material 12 that, in one preferred embodiment, in comprised of glass felt material. As is disclosed on pages 5-6 of Mike Guertin's "Roofing with Asphalt Shingles" (The Taunton Press, Inc., Newtown, Conn., 2002), "The base material gives shingles strength to resist tearing during handling, installation, and in windy conditions. Asphalt shingles have a base of either organic felt or fiberglass. Organic felt was the base for the first asphalt shingles developed in the late 1890s, but fiber-glass-based singles, introduced around 1960, are lighter and less expensive to manufacture. By the late 1970s, fiberglass was more commonly used than organic felt."

In one preferred embodiment, the glass felt material is similar to the material described in section 4 of ASTM D 3462-05. It is disclosed in this section, that "The glass felt shall be a thin porous sheet composed predominantly of fine glass fibers uniformly deposited in a nonwoven pattern. It is permitted to reinforce the glass felt with random or parallel-oriented glass yarns, or both, which are permitted to be gathered or twisted, bonded, or unbonded. The felt shall contain a substantially water-insoluble binding agent."

In one embodiment, the properties of applicants' mineral filler composition, and of their mixture of asphalt and mineral filler composition, are tested by incorporating such compositions into a specified glass felt mat, making a roofing shingle from the glass felt mat impregnated with such composition, exposing said shingle to at least ten cycles of "accelerated aging" testing, and thereafter testing the shingle so aged to various ASTM tests for tear resistance, pull-through resistance, and abrasion resistance.

In one embodiment, the glass felt sheet has a density of from about 1.45 to about 2.2 pounds per 100 square feet of surface area of such glass felt sheet.

In one embodiment, described in more detail elsewhere in this specification, the glass felt sheet has a density of 1.85 pounds per 100 square feet of surface area of such glass felt sheet, a thickness of about 30 mils, and a binder content (which is preferably a modified urea-formaldehyde glass binder) of about 20 percent. In one aspect of this embodiment, this is the glass felt mat that applicants prefer to use to test their roofing compositions and the shingles made therefrom. Such a glass felt sheet is typically used in the roofing industry as a roofing mat and may be commercially obtained, e.g., from the Johns Manville Corporation of Denver, Col. as product "Dura-Glass 7521." Johns Manville describes this material as being " . . . a nonwoven sheet composed of individual sized glass filaments randomly oriented and bonded together with a modified urea formaldehyde resin."

In one embodiment, and referring again to FIG. 1, the base 12 is a structural mat matrix similar to that claimed in U.S. Pat. No. 5,965,638.

In one embodiment, the base 12 is a cured non-woven fiber mat similar to that claimed in U.S. Pat. No. 6,544,911, the entire disclosure of which is hereby incorporated by reference into this specification. The preparation of the mat of U.S. Pat. No. 6,544,911 is illustrated in the examples of such patent, which are discussed in column 5 thereof. It is disclosed that "Tear test D-1922, as referenced in ASTM D-3462 (Jul. 10, 1997 version), was used to determine the tear strength of various glass fiber mats coated on both sides with a 25 mil coating of asphalt conventionally used in roofing materials. In summary, the test measures the force in grams required to tear apart the coated mat specimen using a pendulum device. Acting by gravity, the pendulum swings through an arc, tearing the specimen from a precut slit. The test specimen is held at one end by the pendulum and on the opposite end by a stationary member. The loss in energy by the pendulum is indicated by a scale and pointer, which registers the force required to tear apart the specimen. To a wet web of 25-100 mm long glass fibers, derived from drainage of a white water slurry, was added at room temperature, a standard urea/form-aldehyde binder containing 1 wt. % styrene/acrylate/acrylonitrile polymer modifier (i.e. Acronal S 886 S, supplied by BASF) to provide a fiber to modified binder weight ratio of about 80:20. The web containing fibers and modified binder is then sprayed with an aqueous solution of poly(dimethylsiloxane), supplied by Chem-Trend as product RCTW B9296) to provide a polysiloxane concentration of from 0.25 to 5% with respect to UF, as noted in the following table. The resulting webs were then dried and cured at about 300° C. for a period of 10 seconds to produce cured, non-woven mats, after which the mats were coated on both sides at 215° C. with filled asphalt (comprising 32% w/w asphalt and 68% w/w limestone filler) using a two-roller coater. The styrene/butadiene latex, employed in the examples was supplied Dow Chemical Co. and the urea/formaldehyde binder was obtained from Neste Co."

By way of further illustration, the base 12 may comprise the non-woven mat described in U.S. Pat. No. 6,737,369, the entire disclosure of which is hereby incorporated by reference into this specification.

U.S. Pat. No. 6,737,369, the disclosure of which is hereby incorporated by reference into this specification, discusses various "prior art" patents in column 1 thereof, the disclosure of each of which is also hereby incorporated by reference into this specification. Thus, e.g., U.S. Pat. No. 6,737,369 discloses that "U.S. Pat. No. 4,335,186 discloses a chemically modified asphalt composition where the asphalt is reacted with a nitrogen-containing organic compound which is capable of introducing to the asphalt functional groups that can serve as reactive sites to establish a secure chemical bond between the asphalt and reinforcing fillers, blended into the asphalt, such as glass fibers and siliceous aggregates."

U.S. Pat. No. 6,737,369 also discloses that "U.S. Pat. No. 4,430,465 relates to an article of manufacturing comprising mat fibers, such as glass fibers, that are coated with composition comprising asphalt, an alkadiene-vinylarene copolymer, a petroleum hydrocarbon resin and a branched organic amine which is employed as an anti-stripping agent." It should be noted that this "branched organic amine" also may be used to advantageously coat applicants' limestone powder.

One may use various commercially available amines (or other anti-strip agents) in either the headlap granules composition of this invention (in which either the granules are coated with the amine and/or the composition comprises the amine) or the filled asphalt composition of this invention (in which the filler particles are coated with the amine and/or the asphalt composition is comprised of the amine). By way of illustration and not limitation, one may so use or more of the following anti-strip agents: (1) amine anti-strip agents that comprise an amine anti-strip agent and, optionally, an acid salt; (2) tallow diamine anti-strip agents; (3) amido amine anti-strip agents and/or salts thereof; (4) unsaturated carboxylic acid anti-strip agents; (5) polyamines such as, e.g., epoxylated polyamines; (6) alpha-olefin copolymers; (7) polyetheramine fatty acid salts); (8) fatty acids such as, e.g., oleic acid; (9) silicone oils sold by Goldschmidt Chemical of Hopewell, Va. under the name of "TEGOSIVIN HL100," "TEGOSIVIN HL 15M7" and "TEGOPREN 6800"; (10) naphthenic oils such as that sold by the Cross Oil company as "HS-500;" (11) fatty acid amines such as lauryl amine and stearyl amine; (12) alkylene diamines; (13) dialkyl amines; (14) the aminoester products produced by the reaction of tall oil fatty acid and triethanolamine that are described in U.S. Pat. No. 4,806,166, the entire disclosure of which is hereby incorporated by reference into this specification; (15) polyamine anti-strip agents such as, "PAVEBOND LITE" by the Morton International company, (16) an anti-strip agent sold by the Arizona Chemical company as "100NS."

Referring again to FIG. 1, and to the preferred embodiment depicted therein, it will be seen that the base 12 is preferably surrounded by and impregnated with an asphalt formulation 14 comprised of asphalt 16 and mineral 18. The face of the shingle 10 is coated with colored granules 22, and the bottom 24 is preferably coated with finely crushed minerals 26.

Figure 2:
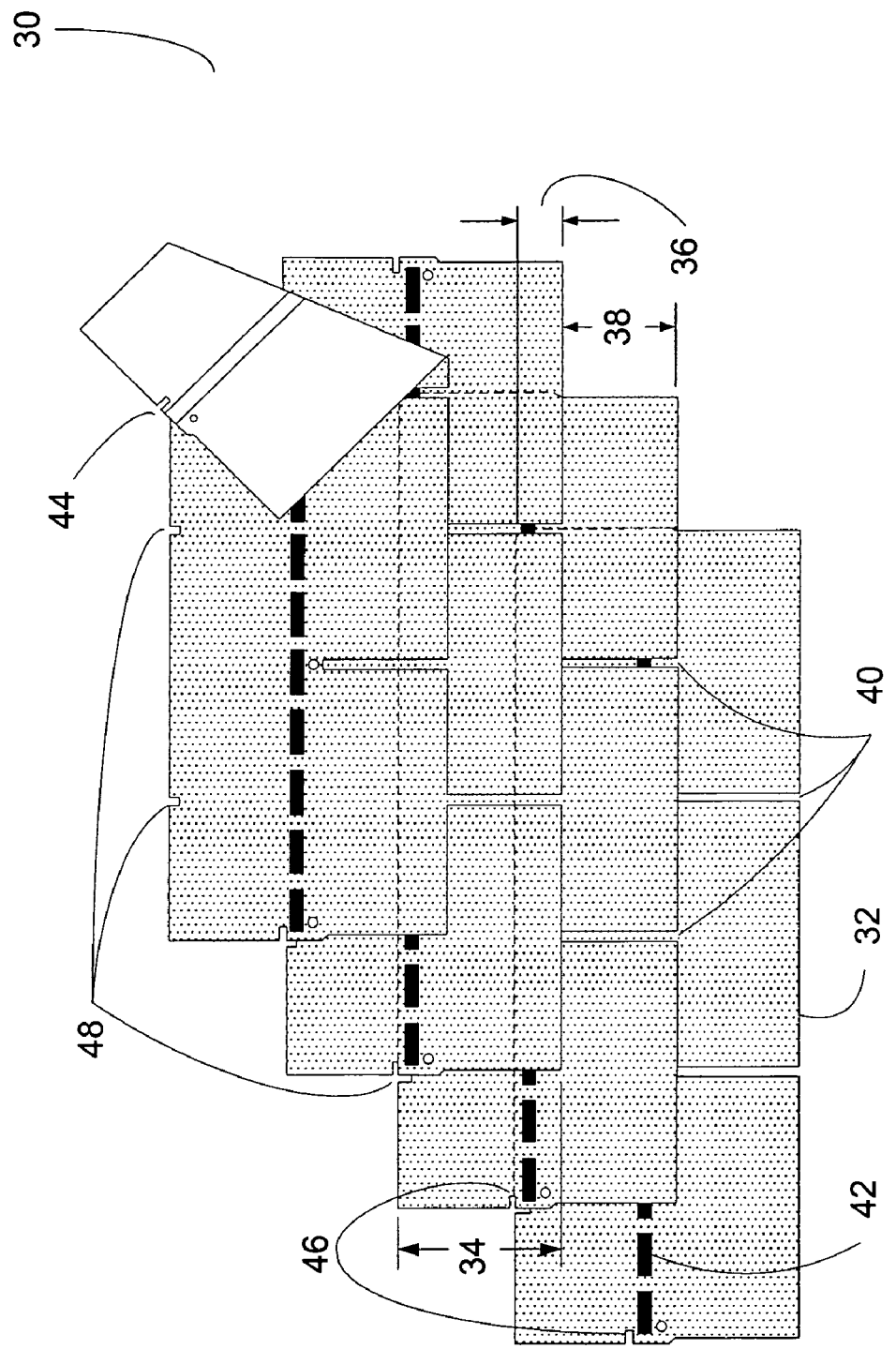
FIG. 2 is a schematic view of several fiberglass shingles arranged to form a roof.

FIG. 2 is a schematic illustration of a roofing assembly 30 that illustrates certain terms commonly used with reference to shingles.

Referring to FIG. 2, which is similar to the Figure appearing at page 9 of the Guertin book, it will be seen that the butt edge 32 is the bottom edge of the shingle, The top lap 34 is that portion of the shingle covered by the next shingle laid on top. Typically, such top lap portion is about 7 inches wide.

The headlap 36 is that portion of the top lap 34 that is covered by the next two shingle courses. The headlap 36 typically is about 2 inches wide.

The exposure 38 is that part of the shingle that is exposed to the weather. The exposure 38 typically is about 5 inches wide.

The cutouts 40 are slots of shingle material cut out of the exposure of a tabbed strip shingle. The cutouts 40 are typically from about 0.37 to about 0.5 inches wide.

The self-seal strip 42 is an adhesive strip (or dots) on the shingle that bonds the butt edge 32 to the shingle beneath when exposed to heat from the sun.

The exposure gauge notches 46 are minute cuts that some manufacturers emboss on the side edges of strip shingles to help the installer gauge the proper exposure.

The offset gauge notches 48 are minute cuts embossed by some manufacturers along the top edge of the shingles to help the installer gauge a standard 6 inch offset on three-tab shingles.

Headlap Granules

In this portion of the specification, applicants will discuss granules comprised of limestone that are especially useful as headlap granules. In one embodiment, these granules include particles having a diameter ranging from about 425 to about 1600 micrometers.

Roofing shingles are comprised of a headlap portion and a butt portion (see FIG. 2 and, e.g., headlap portion 36 and butt portion 32); granules are often used in the headlap portion.

By way of illustration, U.S. Pat. No. 3,921,358, the entire disclosure of which is hereby incorporated by reference into this specification, describes a roofing shingle that has a headlap portion and a butt portion. Claim 1 of this patent describes "A composite asphalt-impregnated felt roofing shingle comprising a rectangular sheet having a headlap portion and a butt portion, the butt portion comprising a series of tabs separated by spaces extending continuously from the headlap portion to the exposed edge of the butt portion; and an elongated rectangular strip of substantial thickness having substantially the same length as the sheet and a width substantially equal to the height of the butt portion, the strip being interwoven with successive tabs, a longitudinal marginal edge of the strip coinciding with the exposed longitudinal marginal edge of the butt portion."

By way of further illustration, U.S. Pat. No. 4,717,614, the entire disclosure of which is hereby incorporated by reference into this specification, discloses a shingle whose headlap portion is coated with a layer of asphaltic material. Claim 1 of this patent describes "A shingle consisting essentially of a rectangular sheet having an headlap portion and a butt portion said headlap portion and said butt portion having an asphaltic undercoating of varying thickness such that a major area of the headlap portion extending from its free marginal edge to the area above said butt portion and representing between about 6/7th and about 4/7th height of the upper headlap portion is coated with a layer of asphaltic material in a lesser thickness of between about 1/20th and about 1/4th the asphaltic undercoat thickness on the butt portion and the remaining 1/7th to 3/7ths area of the adjoining headlap portion extending immediately above said butt portion."

By way of yet further illustration, a process for applying granules to a moving sheet having a headlap area is disclosed in U.S. Pat. No. 4,900,589, the entire disclosure of which is hereby incorporated by reference into this specification. Claim 1 of this patent describes "A process for applying granules to a moving sheet having a headlap area and a butt area for making a shingle roofing product including: applying a sticky material to the headlap area and the butt area of the moving sheet; dispensing blended granules over the butt area at a rate in proportion to a rate of movement of the sheet; dispensing headlap granules over the blended granules on the headlap area at a rate as set by an operator and independent of the rate of movement of the sheet; dispensing recycled headlap granules over the headlap granules on the headlap area at a rate in proportion to the rate of movement of the sheet; dispensing backfall granules over the blended granules on the butt area at a rate in proportion to the rate of movement of the sheet; and cutting the moving sheet into shingle pieces at a rate in proportion to the rate of movement of the sheet."

By way of yet further illustration, U.S. Pat. No. 6,358,305, the entire disclosure of which is hereby incorporated by reference into this specification, describes a "Darkened Headlap Manufacturing Process and Product Produced Thereby." This process is set forth in, e.g., claim 13 of the patent, which describes "13. A process of preparing a darkened headlap for a roof shingle comprising the steps of: treating each ton of a dried crushed rock aggregate having a particle size of from about 10 to about 35 mesh with a suspension consisting of: from about 1.0 to about 2.5 gallons of oil; from about 0.5 to about 2.0 lbs of a carbon black; from about 0.25 to about 1.0 lbs of an organosilicone compound having hydrolysable functional groups and oleophillic groups; preheating the suspension to about 90°-110° F. to reduce viscosity and improve rock pore penetration; and applying the preheated suspension to a headlap."

By way of yet further illustration and referring to column 1 of U.S. Pat. No. 6,358,305, a discussion of the use of headlap granules on roofing shingles is presented. It is disclosed that "Roof shingles have to satisfy function, durability and aesthetic appeal. They also have to be inexpensive in order to be marketable. The prior art had addressed these requirements such as disclosed in U.S. Pat. Nos. 4,128,438; 4,274,243; 4,359,505; and 4,378,408" (see lines 16-23 of column 1)."

U.S. Pat. No. 6,358,305 also discloses (at lines 24-36 of column 1) that "Roof shingles are typically coated with granules. The granules are generally embedded in the asphalt coating on the surface of an asphalt impregnated felt base material, the granules thus forming a coating that provides an adherent, weather-resistant exterior roofing surface. As the granule coating also provides the aesthetic effect observable with respect to the roofing composition, the appearance of the granules is of major marketing interest. For this reason a pigmented color coat is typically applied to the base mineral granules to enhance their visual, decorative effect. Alternatively, natural crushed stone aggregates have been used instead of the artificially colored granules. This approach has resulted in substantial cost savings."

U.S. Pat. No. 6,358,305 also discloses (at lines 37-67 of column 1) that "The prior art has used natural crushed stone aggregates to which a hydrocarbon oil is applied to control dust. This crushed stone aggregate, being less expensive than artificially colored granules, was applied to the headlap portion of the shingles during the manufacturing process. Although natural headlap granules are inexpensive, more extensive use of them is limited by the fact that they are not as dark or uniform in appearance as desired. For that reason, many shingle manufacturers utilize coal slag or other dark waste aggregate for manufacturing headlap. Furthermore, in order to improve the appearance of natural headlap, efforts have been made to induce a darker color. Thus carbon black has been incorporated in the hydrocarbon oil that was applied to control dust. Darkening of the aggregate results when the hydrocarbon oil deposits carbon black particles within the rock pores as the oil is absorbed into the rock surface. Although effective for pigmentation, the carbon black has poor weathering resistance since it is not strongly bonded to the rock surface and is lost within a few months of weathering exposure. It has now been surprisingly discovered during weathering studies that pigmentation retention of natural headlap darkened with a hydrocarbon oil/carbon black mixture can be significantly improved by incorporating certain organosilicone compounds in the mixture."

At column 4 of U.S. Pat. No. 6,358,305, certain "hydrocarbon oils" are described; one or more of these "hydrocarbon oils" may be used in conjunction with the "anti-strip agent" described elsewhere in this specification to prepare coated limestone granules. At lines 47-54 of such column 4, it is disclosed that "The hydrocarbon oils employed in the compositions of the present invention may be either synthetic or natural in origin. These oils, referred to as process oils, can be obtained from petroleum, coal, gas and shale. The oils are of the lubricating oil viscosity range, typically in a 300 centipoise viscosity range. These hydrocarbon oils are often referred to as process oils and are available from several companies, such as Ergon Inc., Arco and Cross Oil Co."

Many abrasive materials, and many roofing granules, are made from slag. Processes for making granules from slag are well known. Reference may be had, e.g., to U.S. Pat. Nos.

4,358,415 (method for producing granules form molten metallurgical slags), 4,374,645 (process for granulation of slag), 4,758,260 (process and device for producing granulated slag sand from blast furnace slag), 4,909,837 (process for granulating molten slag), 6,803,016 (device for atomizing and granulating liquid slags), and the like. The entire disclosure of each of these United States patents is hereby incorporated by reference into this specification.

Thus, and by way of further illustration, and referring to U.S. Pat. No. 3,615,329 (the entire disclosure of which is hereby incorporated by reference into this specification), "Slag from various processes for the removal of copper, lead and zinc from its ore is suitable for use for a variety of purposes, for example railroad roadbed construction, as concrete aggregate and roofing granules, for road surfacing when combined with a binder, and for fertilizers. For convenient handling and processing for each of these applications, it is necessary that the slag be reduced to particulate size."

Roofing granules made from coal slag are also well known. Coal slag and its properties have been widely described in the patent literature. Reference may be had, e.g., to U.S. Pat. Nos. 3,995,079 (artificial turf-like product), 4,174,974 (process for converting coal slag into Portland cement), 4,576,638 (process for the production of ferromanganese), 4,629,506 (process for the production of ferrochromium), 4,971,615 (method and means for producing mineral wool), 5,211,895 (molding process for forming a concrete block), 5,337,824 (coal slag universal fluid), 5,405,648 (coating particulate material with a polymer film), 5,439,056 (coal slag solidification of drilling fluid), 5,681,361 (method of making an abrasive article), 6,001,185 (method for treatment of heavy metal contamination), 6,007,590 (method of making a foraminous abrasive article), 6,109,913 (method for disposing of waste dust), and the like. The entire disclosure of each of these United States patents is hereby incorporated by reference into this specification.

Coal slag is also often referred to as "Cyclone Boiler Slag," "Cyclone Bottom Ash," "Bottom Ash," "Slag Residue," "Black Jack," etc. Granules made from such coal slag often contain substantial amounts of toxic metals, such as, e.g., arsenic, barium, cadmium, chromium, lead, mercury, selenium, and silver. The concentrations of these metals in a particular matrix may be measured by well known methods such as, e.g., the "Toxicity Characteristic Leaching Procedure" (TCLP), which is described, e.g., in EPA method SW 846-1311.

As is well known to those skilled in the art, heavy metals (such as arsenic, barium, cadmium, chromium, lead, mercury, selenium, and silver) are found to contaminate ground water and, when consumed via drinking water and certain injected foods, they accumulate over time in the human body tissue.

One of the heavy metals that present health concerns is cadmium. Cigarette smoking has been reported to be a major source of cadmium exposure. In non-smokers, food is the most important source of cadmium exposure. Recent data indicate that adverse health effects of cadmium exposure may occur at lower exposure levels than previously anticipated, primarily in the form of kidney damage but possibly also bone effects and fractures. It is known that cadmium causes permanent damage to the kidneys of human beings and is not easily excreted from the body. Cadmium also causes lung damage such as emphysema, as well as hypertension and osteoporosis. A suspected carcinogen, cadmium increases the risk of lung cancer and prostate cancer.

Another of the heavy metals that presents health risks is mercury. The general population is primarily exposed to mercury via food, fish being a major source of methyl mercury exposure, and dental amalgam. The general population does not face a significant health risk from methyl mercury, although certain groups with high fish consumption may attain blood levels associated with a low risk of neurological damage to adults. Since there is a risk to the fetus in particular, pregnant women should avoid a high intake of certain fish, such as shark, swordfish and tuna; fish (such as pike, walleye and bass) taken from polluted fresh waters should especially be avoided.

Another of the heavy metals that presents health risks is lead. The general population is exposed to lead from air and food in roughly equal proportions. During the last century, lead emissions to ambient air have caused considerable pollution, mainly due to lead emissions from petrol. Children are particularly susceptible to lead exposure due to high gastrointestinal uptake and the permeable blood-brain barrier.

Arsenic is another heavy metal that presents health risks. Exposure to arsenic is mainly via intake of food and drinking water, food being the most important source in most populations. Long-term exposure to arsenic in drinking-water is mainly related to increased risks of skin cancer, but also some other cancers, as well as other skin lesions such as hyperkeratosis and pigmentation changes. Occupational exposure to arsenic, primarily by inhalation, is causally associated with lung cancer. It is known that arsenic causes neurological and liver damage and has been shown to cause skin cancer. Inhaled arsenic can increase the risk of lung cancer, as has been observed in humans exposed to high levels of airborne arsenic in or around smelters."

As is known to those skilled in the art, essential metals are required by all organisms in small quantities in order to accomplish specific catalytic functions. However, at levels exceeding these requirements, both essential and non-essential metals can disturb metabolism by binding non-specifically to biomolecules and by inflicting oxidative damage due to their ability to catalyze redox reactions. This can result in the deactivation of essential enzymatic reactions, damage to cellular structures (especially membranes), and DNA modification (mutagenesis). In humans, exposure to high levels of metals can cause acute toxicity symptoms, while long-term exposure to lower levels can trigger allergies and even cancers. In all organisms, uptake, localization, cytoplasmic concentration, and targeting of micronutrient metals must be tightly controlled in order to meet nutritional needs while avoiding damage. Any non-essential metals that enter organisms by virtue of their chemical similarity to nutrient ions must be detoxified and/or excreted.

It is known that metals tend to accumulate in animals and plants. They enter aquatic organisms through body and respiratory surfaces, and by ingestion of particulate matter and water. Toxicity manifests as impairment of metabolic function, with possible changes to the distribution and abundance of populations. Sublethal effects may include changes in morphology, physiology, biochemistry, behavior and reproduction. Massive fish kills can occur when aluminum and iron are mobilized with drainage from acid sulfate soils. The extent of metal uptake, toxicity and bioaccumulation varies depending on the organism, and can be modified by temperature, pH, turbidity, dissolved oxygen and the concentrations of other metals in solution. Accumulation of metals by aquatic organisms (e.g., bivalves and crabs can be a useful indicator of the presence of metals in biologically available forms. If metal levels in organisms are too high for human consumption, shell-fishing waters are closed.

Coal slag and roofing granules made therefrom, are believed to contain one or more of the aforementioned heavy metals. It is not known to what extent, if any, coal slag particles that are disposed within a biological organism degrade and releases either heavy metals and/or other contaminants to the biological organism.

It is known, however, that many products derived from coal, such as coal tar, contain substantial amounts of polycyclic aromatic hydrocarbons (PAH). As is disclosed in an article by D. James Fitzgerald et al., "Application of Benzo (a)pyrene and Coal Tar Tumor Dose-Response Data to a Modified Benchmark Dose Method of Guideline Development," Environmental Health Perspectives, Volume 112, Number 14, October, 2004, pages 1341-1346, "Polycyclic AH (PAH) aromatic hydrocarbons ... are found at a variety of contaminated sites throughout the world from industries such as coal gasification, coke production . . . and creosote and asphalt production. Some PAHs, for example the well-studied benzo(a)pyrene . . . , are mutagenic and carcinogenic in experimental animals and probably in humans also . . . " (See page 1341)

Granules made from coal slag are abrasive and tend to form slivers which imbed themselves in the skin of roofers. It is not known to what extent the roofers' bodies are able to extract heavy metal(s) and/or polycyclic aromatic hydrocarbons from such coal slag granules. What is known, however, is that such embedded slivers provoke a body's immune responses with consequences that are not always beneficial. In one embodiment of the instant invention, there is provided a particle compact comprised of a multiplicity of biodegradable granules, wherein said granules contain at least about 50 weight percent of calcium carbonate and less than about 100 parts per million of a metal selected from the group consisting of arsenic, barium, cadmium, chromium, lead, mercury, selenium, and silver, and wherein said granules contain less than about 100 parts per million of a polycyclic aromatic hydrocarbon.

Figure 3:
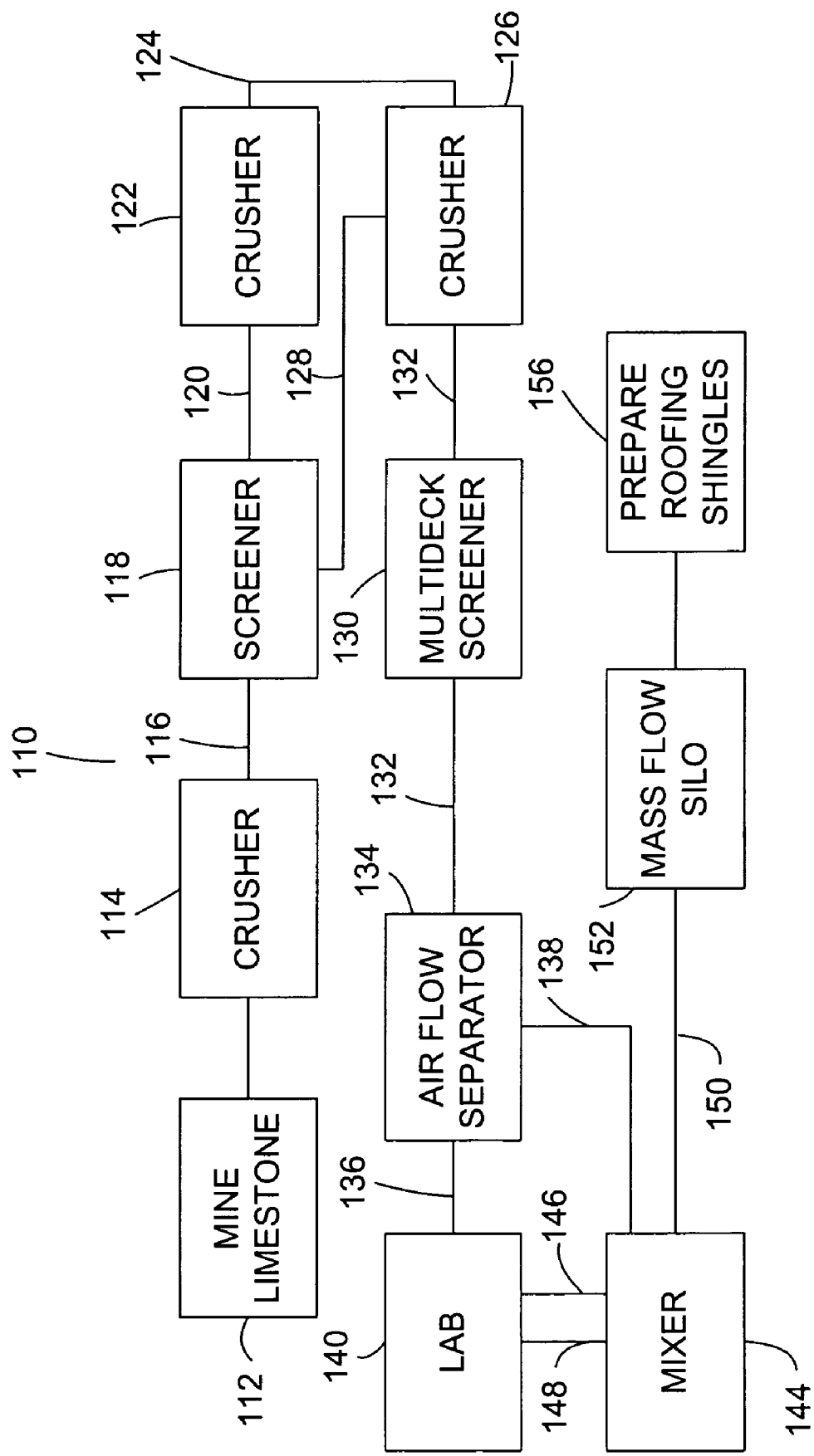
FIG. 3 is a flow diagram of one preferred process of the invention.

FIG. 3 is a flow diagram of a preferred process 110 for preparing some preferred mineral granules (such as, e.g., limestone granules) of this invention. For the sake of simplicity of discussion, reference will be made to limestone granules, but it will be apparent to those skilled in the art that the technology described is also applicable to other mineral granules.

It will also be apparent that the process depicted in FIG. 3 also may be used to prepare limestone (or other mineral filler) particles that are smaller in size than about 212 microns and that may be mixed with asphalt to produce a roofing composition that, when impregnated into a glass felt mat, produces a roofing shingle assembly. The process depicted in FIG. 3 has the ability to classify the mineral material into a great number of differently sized fractions that can be segregated and then recombined in many different ways to produce many novel combinations of materials.

Referring to FIG. 3, and in step 112 of the process depicted, the limestone is mined by conventional means. The limestone so mined preferably in one embodiment, contains at least about 50 weight percent of limestone.

Limestone, processes for mining it, processes for treating it, methods of using it, and compositions containing it are well known to those skilled in the art. Reference may be had, e.g., to U.S. Pat. Nos. 3,601,376 (process for preheating limestone), 3,617,560 (limestone neutralization of dilute acid waste waters), 3,722,867 (method of calcining limestone), 3,900,434 (wallboard tape joint composition comprised of limestone), 4,015,973 (limestone-expanding clay granules), 4,026,7632 (use of ground limestone as a filler in paper), 4,231,884 (water retardant insulation composition comprising treated low density granular material and finely divided limestone), 4,237,025 (product comprising lime or limestone and Graham's salt), 4,239,736 (method for increasing the brightness of limestone), 4,272,498 (process for comminuting and activating limestone by reaction with carbon dioxide), 4,316,813 (limestone-based sorbent agglomerates), 4,390,349 (method for producing fuel gas from limestone), 4,430,281 (process for palletizing limestone fines), 4,594,236 (method of manufacturing calcium carbide from limestone), 4,614,755 (protective coating composition comprising a blend of polyvinyl acetate, hydraulic cement, EVA, and limestone), 4,629,130 (process for preparing finely divided limestone), 4,671,208 (clay and limestone composition), 4,710,226 (fluidization of limestone slurries), 4,781,759 (limestone and clay traction aid) 4,824,653 (method of bleaching limestone), 5,228,895 (fertilizer and limestone product), 5,375,779 (process for grinding limestone to a predetermined particle size distribution), 5,908,502 (limestone filled Portland cements), and the like. The entire disclosure of each of these United States patents is hereby incorporated by reference into this specification.

Referring to FIG. 3, and in step 12 thereof, limestone is mined. One may, e.g., use many of the conventional techniques used for mining minerals.

It is preferred that the limestone so mined contain at least about 60 weight percent of calcium carbonate. In one preferred embodiment, the limestone so mined contains at least about 70 (and more preferably at least about 80) weight percent of calcium carbonate. In another embodiment, the limestone contains at least about 85 weight percent of calcium carbonate. In another preferred embodiment, the limestone so mined contains at least about 90 weight percent of calcium carbonate and, more preferably, at least about 95 weight percent of calcium carbonate.

In one preferred embodiment, the limestone so mined is biodegradable. As used in this specification, the term biodegradable refers to a substance that can be decomposed by the biochemical systems of biological organisms (refer to the means, e.g., by which chickens decompose limestone fed to them). Reference may be had, e.g., to U.S. Pat. Nos. 3,919,163 (biodegradable containers), 4,356,572 (biodegradable implant used as bone prosthesis), 5,174,581 (biodegradable clay pigeon), 5,316,313 (frangible biodegradable clay target), 5,651,550 (biodegradable edible target), 5,993,530 (biodegradable resin composition), 6,029,395 (biodegradable mulch mat), 6,573,340 (biodegradable polymer films), 6,890,872 (fibers comprising starch and biodegradable polymers), and the like. The entire disclosure of each of these United States patents is hereby incorporated by reference into this specification.

In one preferred embodiment, the limestone so mined contains less than 5 milligrams per kilogram of arsenic, less than 100 milligrams per kilogram of barium, less than 1 milligram per kilogram of cadmium, less than 5 milligrams per kilogram of chromium, less than 5 milligrams per kilogram of lead, less than 0.2 milligrams per kilogram of mercury, less than 1.0 milligram per kilogram of selenium, and less than 0.2 milligrams per kilogram of mercury. As will be apparent, 1 milligram per kilogram is equivalent to 1 part per million.

In one preferred embodiment, the limestone so mined contains less than about 100 parts per million of a of a leachable metal selected from the group consisting arsenic, barium, cadmium, chromium, lead, mercury, selenium, silver, and mixtures thereof. The presence, or absence, of such a leachable metal may be determined, e.g., in accordance with the "Toxicity Characteristic Leaching Procedure" ("TCLP") that is set forth in the Environmental Protection Agency (EPA) method SW 846-1311. This "TCLP" test is well known to those skilled in the art and is described in, e.g., U.S. Pat. Nos.

5,127,963 (process for detoxifying lead contaminated materials), 5,193,936 (fixation and stabilization of lead in contaminated soil and solid waste), 5,196,620 (fixation and utilization of ash residue from the incineration of municipal solid waste), 5,245,114 (immobilization of lead in bottom ash), 5,252,003 (attenuation of arsenic leaching from particulate material), 5,278,982 (fixation and stabilization of metals in contaminated materials), 5,397,478 (fixation and stabilization of chromium in contaminated materials), 5,421,906 (methods for removal of contaminants from surfaces), 5,430,223 (immobilization of lead in solid residues from reclaiming metals), 5,430,234 (process for removing phosphorous and heavy metals from phosphorous trichloride still bottoms residue), 5,678,235 (safe ceramic encapsulation of hazardous waste with specific shale material), 5,859,306 (method of treating arsenic-contaminated matter using aluminum compounds), 5,806,908 (water insoluble heavy metal stabilization process), 5,877,393 (treatment process for contaminated waste), 5,897,685 (recycling of CdTe photovoltaic waste), 5,898,093 (treatment process for contaminated waste), 6,717,363 (control of leachable mercury in fluorescent lamps by gelatin), 6,383,398 (composition and process for remediation of waste streams), 6,590,133 (reducing lead bioavailability), 6,637,354 (coal combustion products recovery process), 6,688,811 (stabilization method for lead projectile impact area), 6,781,302 (low pressure mercy vapor fluorescent lamps), and the like. The entire disclosure of each of these United States patents is hereby incorporated by reference into this specification.

By way of illustration, the TCLP test is discussed in U.S. Pat. No. 5,860,908, the entire disclosure of which is hereby incorporated by reference into this specification. This patent discloses that "The leaching of heavy metal bearing wastes and human and biological exposure to heavy metal content has long been of concern to environmental regulators and waste producers. Under the Resource Conservation and Recovery Act (RCRA) solid waste is classified by the U.S. Environmental Protection Agency (EPA) as hazardous waste if excessive amounts of heavy metals leach from the waste when tested under the Toxicity Characteristic Leaching Procedure (TCLP). EPA also regulates the land disposal of certain heavy metal bearing wastes depending on the content of the heavy metals regardless of the leaching potential. In addition, several state governments require solid wastes with elevated levels of heavy metals be disposed of as a hazardous waste. Disposal of waste at a hazardous waste landfill is typically more expensive than disposal at non-hazardous waste landfills."

Referring again to FIG. 3, it should be noted that not only does the limestone so mined contain less than 100 parts per million of a leachable metal selected from the group consisting arsenic, barium, cadmium, chromium, lead, mercury, selenium, silver, and mixtures thereof, but it also contains less than 100 parts per million of a metal selected from the group consisting arsenic, barium, cadmium, chromium, lead, mercury, selenium, silver, and mixtures thereof, regardless of whether such metal is "leachable" in accordance with the TCLP test.

There has been some concern expressed that roofing granules made from slag might contain carbon-containing residues that might be mutagenic and/or carcinogenic when incorporated into living biological organisms. Thus, e.g., the "oxidation products" from cigarette smoke have been reported to contain many different mutagen and/or carcinogens. Similarly, the "oxidation products" produced by cooking a steak over a very high flame also contain many mutagens and/or carcinogens.

It appears that many roofing granules are prepared by combusting coal. Thus, e.g., U.S. Pat. No. 6,258,456, the entire disclosure of which is hereby incorporated by reference into this specification, discusses the preparation of roofing granules from slag produced from the combustion of coal, disclosing that "Each year many tons of materials such as slag and fly ash resulting from combustion of coal in boilers, hereinafter referred to as coal slag and coal fly ash, found in electric generating plants are produced. In the United States in 1993, for example, over 5.6 million metric tons of coal slag and 43.7 million metric tons of coal fly ash were produced as coal combustion byproducts. The greatest use of such materials is found in roofing granules and as sandblasting materials. Other uses are found in cement and concrete products, snow and ice control, and grouting materials. However, only about 55% of the coal slag and only about 22% of the coal fly ash is incorporated into useful products. The remaining amount is generally disposed of in landfills."

Referring again to FIG. 3, and in one preferred embodiment, both the limestone mined (see FIG. 3) and the coated granular material made therefrom (see FIG. 3) contain less than 100 parts per million of a metal selected from the group consisting of arsenic, barium, cadmium, chromium, lead, mercury, selenium, silver, and mixtures thereof. In one embodiment, the properties of the limestone used for headlap granules are similar in respects (but not necessarily in particle size) to the properties of the particles used as filler in filled asphalt coatings.

Referring again to FIG. 3, and in one preferred embodiment depicted therein, the limestone mined has a solubility product constant of from about $3 \times 10^{-9}$ to about $6 \times 10^{-9}$ and, more preferably, from about $3 \times 10^{-9}$ to about $5.3 \times 10^{-9}$. As is known to those skilled in the art, the solubility product constant ($K_{sp}$) is a type of simplified equilibrium constant defined for and useful for equilibria between solids and their respective ions in solution. Reference may be had, e.g., to the specifications and claims of U.S. Pat. Nos. 4,043,817 (method of forming photographic images for lithographic use), 4,338,288 (sorbent for removing metals from fluids), 4,513,818 (method for reducing scale in geothermal systems), 4,554,245 (color reversal light-sensitive materials), 4,656,122 (reversal photographic elements containing tabular grain emulsions), 5,317,521 (process for independently monitoring the presence of and controlling addition of silver and halide ions to a dispersing medium during silver halide precipitation), 5,545,681 (pH-modified polymer compositions with enhanced biodegradability), 5,620,893 (microbial mediated method for soil and water treatment), 6,120,756 (topical anionic salicylate for disorders of the skin), 6,576,584 (method of producing hydrotreating catalyst), and the like. The entire disclosure of each of these United States patents is hereby incorporated by reference into this specification.

Referring again to FIG. 3, and in step 114 thereof, the limestone from step 112 is subjected to primary crushing in step 114. One may use any of the primary crushing devices and/or processes known to those skilled in the art.

Referring again to FIG. 3, and to step 114 thereof, in one aspect of this embodiment, the size of the limestone is reduced in step 114 to minus 4 inches, i.e., the top maximum size is less than 4 inches.

Referring again to FIG. 3, and to the preferred embodiment depicted therein, the material from crusher 114 is preferably fed via line 116 to screener 118, which separates the material so fed into various size fractions. One may use any of the screeners known to those skilled in the art. Thus, e.g., and referring to pages 74-75 of the Boynton book, one must use a vibratory screener such as, e.g., a screener utilizing mechanical vibration with inclined screen surfaces, a screener using mechanical vibration with horizontal screen surfaces, an electromagnetic vibratory screener, and the like.

In one preferred embodiment, and referring again to FIG. 3, any material from screener 118 with particles sized greater than about 1.75 inches is preferably fed via line 120 to crusher 122, wherein it is crushed to sizes smaller than 1.75 inches and then fed via line 124 to crusher 126. By contrast, material from screener 118 with particles smaller than 1.75 inches is preferably fed directly via line 128 to crusher 126.

Crusher 126 preferably further reduces the size of the limestone particles to a top size of 0.625 inches. The "minus ⅝ fraction" is then preferably fed to multideck screener 130 via line 132.

Multiple deck screeners are well known to those skilled in the art; reference may be had to U.S. Pat. No. 5,341,939, the entire disclosure of which is hereby incorporated by reference into this specification. This patent claims (in claim 1 thereof) "1. A vibrating screen apparatus for material screening including in combination: a frame; at least first and second elongated vibrating screen decks having first and second sides and first and second ends; first and second pivot means for pivotally mounting the first ends of said first and second vibrating screen decks, respectively, on said frame, with said first vibrating screen deck located above said second vibrating screen deck; first and second means coupled with first and second said vibrating screen decks, respectively, for rotating said first and second vibrating screen decks about said first and second pivot means for varying the angle of said first and second vibrating screen decks relative to said frame; means for vibrating said first and second vibrating screen decks; and flexible curtain members extending between the first sides and the second sides, respectively, of said first and second vibrating screen decks to ensure that material falling through said first vibrating screen deck drops onto said second vibrating screen deck."

U.S. Pat. No. 5,341,939, in column 1 thereof, discusses other multiple deck screeners. It is disclosed in such column 1 that "Vibrating material sorting screens are used in a variety of applications, including sand and gravel businesses and in mining operations. Such vibrating screens are used to sort material size, and typically comprise an elongated deck, which slopes downwardly from the feed end to the material delivery end. Usually, the decks are mounted in a deck holding frame, which, in turn, is supported on springs extending to a platform on a support surface. An eccentric vibrator is employed to vibrate the frame on the springs to cause a shaking of the material poured onto the vibrating screen deck to facilitate the movement of the material down the deck, and to expedite the material separation. Both the aperture of the screen and the size of the deck determine the separation size of the materials, and any material which is larger than the screen aperture finally is supplied from the end of the deck to a suitable receptacle. All material which is smaller than the screen aperture falls through the deck for further separation or processing."

U.S. Pat. No. 5,431,939 also discloses (in such column 1) that "In some mining applications, the vibrating screen apparatus has two decks located one above the other, with the larger screen aperture on the top deck and a smaller screen aperture on the lower deck. In the sand and gravel business, three to five decks frequently are used, with the decks progressing in screen aperture from the largest at the top to the smallest at the bottom. Usually, all of these decks are mounted together in a single frame, vibrated by a single vibrating apparatus. The slope of each deck, from the feed end or material receiving end to the delivery end, is fixed once the vibrating screen apparatus is assembled. In addition, a single vibrating weight and drive motor is used; so that the magnitude and frequency of vibration of the entire unit is the same."

U.S. Pat. No. 5,431,939 also discloses (in such column 1) that "When a multiple deck vibrating screen unit is employed, the magnitude and frequency of the vibration necessarily is a compromise between the optimum magnitude and speed of vibration required for the deck separating the larger size materials and the magnitude and speed of vibration required for the deck which is separating the smaller sized materials. In addition, the rate at which materials traverse the deck from the feed end to the delivery end varies, depending upon the size of the material; so that a compromise generally is made in the slope of the decks during the manufacturing of a multiple deck unit. In some cases, the slope angle of the different decks can be made to vary relative to one another; but once the unit is made, the different slope angles cannot further be adjusted in a typical deck."

U.S. Pat. No. 5,341,939 also discloses that "When multiple deck units having three or more decks are employed, the compromises, which must be reached between the slope or angle of the different decks and the magnitude and speed of the vibrator, result in ever greater departures from the optimum, which would be desired for each deck having a single screen size. In view of this, it is desirable to provide a vibrating screen apparatus for a multiple deck unit which may be operated with each deck vibrated independently of the others, and where the angle or slopes of the decks may be independently varied, as desired."

Referring again to FIG. 3, and to multideck screener 130, it is preferred, in one embodiment, that such multideck screener 130 comprise a 4 mesh screen, an 11 mesh screen, and 18 mesh screen, a 24 mesh screen, and a 32 mesh screen.

In another embodiment, where filler is being made to mix with asphalt and prepare a roofing composition, different screen sizes may be used. From the primary crusher and secondary crusher, a material of <1.5 inches is generated. Oversized materials are sent to an impactor and re-sorted to assure 100 percent <1.5 inches. This material is separated into feed for two systems which make asphalt filler material (85-200 mesh) (AKA $85/200$ grade).

One system uses a roller mill which is fed directly with the minus 1.5 inch material. This material is ground between a fixed bull ring and a series of suspended weights which are rotated within this bull ring. An air stream picks up the ground material which is separated via an internal separator within the mill. The desired sized material is collected from the air stream via either cyclone collection or by a dust collector.

The other manufacturing method used to make $85/200$ is as follows. The minus 1.5 inch material is sent to a tertiary crusher which produces material <⅜ of an inch. This material is sent across a series of screens. One fraction of this screened material is a minus 16 mesh material. This minus 16 mesh material is run through an air separator. Two separate streams are generated here with the coarser stream being material between 16 mesh and 120 mesh, and the finer stream being the $85/200$ stream.

Referring again to FIG. 3, a portion of the material screened in multideck screener 130 may be fed via line 132 to air flow separator 134, in which the concentration of "fines content" of such material (i.e., the particles smaller than 250 microns) is adjusted to yield the desired particle size distribution of 85 weight percent being smaller than 200 microns. The air separator works on the process of employing an air stream to transfer the material (both desired size and coarser material) through a turbine classifier. The classifier rotates at a speed as a function of the desired top end separation. The material that is desired is light enough to be transferred through the volume spaces between the rotating fins of the separator, while the coarser materials are deflected to the perimeter and collected via a separate stream.

Air flow separators are well known to those skilled in the art, and they are referred to in the claims of U.S. Pat. Nos. 5,541,831 (computer controlled separator device), 5,943,231 (computer controlled separator device), 6,351,676 (computer controlled separator device), and the like. The entire disclosure of each of these United States patents is hereby incorporated by reference into this specification.

Air separators are also discussed in U.S. Pat. Nos. 3,772,857 (water air separator), 3,874,444 (duo-baffle air separator apparatus), 3,877,454 (air separator), 3,962,072 (air separator apparatus), 4,662,915 (powder air separator), 4,824,559 (rotary air separator), 5,244,481 (vertical air separator), 5,788,727 (centrifugal air separator), 6,053,967 (air separator), 6,664,479 (method and air separator for classifying charging material reduced in size), and the like.

Referring again to FIG. 3, and to the preferred embodiment depicted therein, the material fed from air flow separator 130 via line 138 preferably ranges in particle size from about 100 to about 2,500 microns, with at least 60 weight percent of the particles having sizes in the range of from about 600 to about 1400 microns. In one embodiment, at least about 70 weight percent of the particles have sizes in the range of from about 600 to about 1400 microns. In another embodiment, at least about 80 weight percent of the particles have sizes in the range from about 600 to about 1400 microns. In yet another embodiment, at least about 85 weight percent of the particles have sizes in the range of from about 600 to about 1400 microns.

In another embodiment, where the material from the air separator 134 is to be used for mixing with asphalt to produce roofing compositions, the material fed from air flow separator 134 (via line 138) ranges in particle size from about 500 to about 2500 microns (and, more preferably, from about 500 to about 2,000 microns). The air flow separator 134 preferably reduces the "fines content" of the particle compact so that the output in line 138 contains less than about 4 weight percent of particles smaller than 250 microns (60 mesh) and, more preferably, less than about 3 weight percent of particles smaller than 250 microns. In one embodiment, the material fed via line 138 contains less than 2 weight percent of material smaller than 250 microns and, more preferably, less than about 1 weight percent of material smaller than about 250 microns. In one embodiment, the material fed via line 138 contains less than about 0.4 weight percent of material smaller than 250 microns.

Referring again to FIG. 3, and to the preferred embodiment depicted therein, a portion of the material produced in air flow separator may be periodically withdrawn via line 136 to laboratory 140, in order to test the particle size distribution of such material. The particle size analysis may be conducted by conventional means. Reference may be had, e.g., to pages 92-109 of Barry A. Wills "Mineral Processing Technology," Sixth Edition (Butterworth Heinemann, Oxford, 1997. Reference also may be had, e.g., to U.S. Pat. Nos. 4,288,162 (measuring particle size distribution), 4,736,311 (particle size distribution measuring apparatus), 4,742,718 (apparatus for measuring particle-size distribution), 5,094,532 (method and apparatus for measuring small particle size distribution), 5,164,787 (apparatus for measuring particle size distribution), 5,185,641 (apparatus for simultaneously measuring large and small particle size distribution), 5,578,771 (method for measuring particle size distribution), 5,682,235 (dry particle-size distribution measuring apparatus), 6,191,853 (apparatus for measuring particle size distribution and method for analyzing particle size distribution), 6,252,658 (particle size distribution measuring apparatus), 6,281,972 (method and apparatus for measuring particle size distribution), 6,864,979 (particle size distribution measuring apparatus), and the like. The entire disclosure of each of these United States patents is hereby incorporated by reference into this specification.

Figure 4:
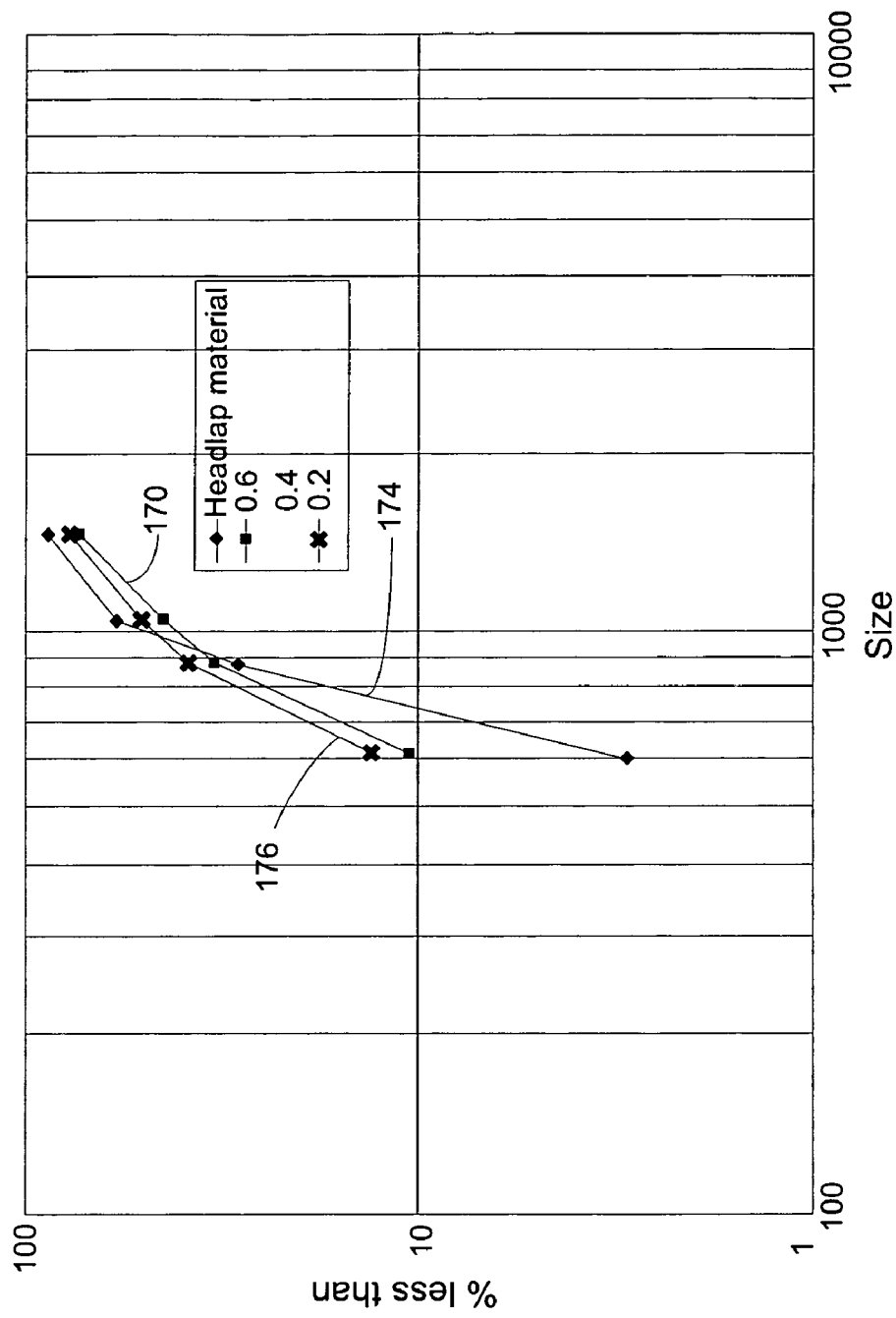
FIG. 4 is a "CPFT graph" of a preferred particle compact showing its particle size distribution ("percent finer than") between from about 600 to about 1400 microns.

FIG. 4 is a series of "CPFT" plots for several preferred materials that may be fed via line 138 to mixer 144. As is known to those skilled in the art, and as is disclosed at pages 75-91 of James E. Funk et al.'s "Predictive Process Control of Crowded Particulate Suspensions" (Kluwer Academic Publishers, Boston, Mass., 1994), the "Dinger-Funk Particle Size Distribution Equation" is represented by $CPFT/100=(D^n-DS^n)/(DL^n-DS^n)$, wherein CPFT is equal to the cumulative percent finer than, D is the particle size, DS is the smallest particle size, DL is the largest particle size, and n is the distribution modulus. Reference also may be had to U.S. Pat. Nos. 4,441,887 (stabilized slurry and process for preparing same), 4,477,259 (grinding mixture and process for preparing a slurry therefrom), 4,468,232 (process for preparing a clean coal-water slurry), 4,477,260 (process for preparing a carbonaceous slurry), 4,479,806 (stabilized slurry and process for preparing the same), 4,501,205 (process for burning a carbonaceous slurry), 4,526,584 (process for pumping a carbonaceous slurry), 4,650,496 (process for making a carbonaceous slurry), 4,780,109 (coal water suspensions involving carbon black), 4,812,427 (clay slurry), 4,812,428 (process for preparing a clay slurry), 4,880,759 (ball clay slurry), 6,391,373 (rheologically modified confectioneries produced by employing particular particle size distributions), and the like. The entire disclosure of each of these United States patents is hereby incorporated by reference into this specification.

Referring again to FIG. 4, the plots depicted are preferably created by measuring the percent less than a number of screens which are in the range of the material in question; for the plots depicted, 12, 16, 20 and 30 mesh screens were used. The resulting data were then plotted against theirs corresponding micron equivalents in micrometers using the X axis as the size and the Y axis as the percent finer than. Both axes are set to logarithm $_{10}$ scale.

Referring again to FIG. 4, it will be seen that plot 170 has a distribution modulus of about 0.6, plot 174 has a distribution modulus of about 0.4, and plot 176 has a distribution modulus of about 0.2. As will be apparent, the material represented by these plots is relatively uniform in size. As is known to those skilled in the art, the distribution modulus for a mono-dispersion can be approximated by a large positive number.

If one were to plot a curve fit where "n" approached a large positive number, it will be seen that the distribution modulus (the "n" value in the CPFT equation) is from about 0.08 to about 0.14. In one embodiment, such slope ("n," "distribution modulus") is from about 0.11 to about 0.13.

Referring again to FIG. 3, the material fed via line 138 to mixer 144 preferably has the desired particle size distribution and a distribution modulus of from about 0.08 to about 0.14. If either or both of these values are not as desired, they may be adjusted by adding to mixer 144 more particulate material via line 146. After such addition, and appropriate mixing, sampling of the material in mixer 144 may occur via line 148; and the process may be repeated until the desired values have been obtained.

Once the desired particle size distribution in mixer 144 has been obtained, one may add a mixture of oil and anti-strip agent via line 146 to coat the inorganic particles in such mixer. The goal, in this embodiment, is to produce a coating on such particulate matter with a thickness of from about 200 to about 2000 nanometers and, preferably from about 300 to about 1200 nanometers.

By way of yet further illustration, one may use the adhesion improving additives disclosed in U.S. Pat. No. 4,038,102, the entire disclosure of which is hereby incorporated by reference into this specification. Claim 1 of this patent describes "1. An additive for improving the adhesion of asphalt to aggregate comprising an ether amine having the general formula [FIG. 3]: . . . wherein: R1 is a hydrocarbon group having from about six to about sixteen carbon atoms, selected from the group consisting of alkyl and alkenyl; R2, R3, R4 are selected from the group consisting of hydrogen and alkyl radicals having from one to about two carbon atoms; n1 and n2 are numbers within the range from one to about four; x1 and x2 are numbers within the range from zero to about five, the sum of x1 and x2 being from one to five; the total number of carbon atoms in each [FIG. 2] . . . unit being from one to about four; and an alkanolamnine having the formula [FIG. 2] . . . wherein: R6 and R7 are selected from the group consisting of hydrogen and alkyl groups having from one to about two carbon atoms; n3 is a number within the range from two to about four; x3 is a number within the range from one to about three; the total number of carbon atoms in each [FIG. 3] . . . unit being with the range from two to four." Some of the "ether amines" described by such formula include, e.g., " . . . Exemplary ether amines in accordance with the invention are octoxyethylamine, decoxyethylamine, dodecoxyethylamine, tetradecoxyethylamine, hexoxypropylamine, octoxypropylamine, nonoxypropylamine, decoxypropylamine, dodecoxypropylamine, tetradecoxypropylamine, palmityloxypropylamine, myristyloxypropylamine, hexyl dioxyethylene oxyethylamine, octyl trioxyethylene oxyethylamine, dodecyl tetraoxyethylene oxyethylamine, myristyl dioxyethylene oxypropylamine, octyl tetraoxyethylene oxypropylamine, dodecyl tetraoxyethylene oxypropylamine, octyl dioxypropylene oxypropylamine, decyl trioxypropylene oxyethylamine, tetradecyl tetraoxypropylene oxypropylamine, octyl oxypropylene oxypropylamine, palmityl tetraoxypropylene oxypropylamine, heptenyl oxypropylene oxypropylamine, decenyl dioxyethylene oxyethylamine, octenyl oxypropylene oxyethylamine, dodecenyl tetraoxypropylene oxypropylamnine, octyloxybutylene oxbutylamine, decyl trioxybutylene oxybutylamine, dodecyl tetraoxybutylene oxyethylamine, palmityl dioxybutylene oxypropylamine, decyl tetraoxy propylene oxypropylamine, and dodecyloxy propylene oxyethylamine."

By way of further illustration, one may use the amine anti-stripping agent disclosed in U.S. Pat. No. 4,721,159, the entire disclosure of which is hereby incorporated by reference into this specification. Claim 1 of this patent describes: "1. An asphaltic composition comprising asphalt admixed with an aggregate and, at the interface between said asphalt and said aggregate the reaction product of an amine anti-strip and an acid salt in an amount sufficient to bind said asphalt to said aggregate; said acidic salt being a divalent or trivalent metal salt of an inorganic acid." In the background section of this patent, it is disclosed that "Various efforts to improve adhesion are detailed in patents such as U.S. Pat. Nos. 2,582,823 and 2,582,824 to Fowkes in which the amine type of anti-stripping agents or the use of acids and soaps, as well as the use of lime, are discussed and their disadvantages noted. In an attempt to improve these well-known problems, with respect to cut-back asphaltic compositions, there is disclosed a priming solution to be used to attain this better adhesion. For this purpose Fowkes discloses using alkaline metal salts of certain inorganic acids to form a wet aggregate which is admixed with the cut-back asphalt. Such priming solution does not give the necessary adhesion, does not work with all types of aggregates, and does not work satisfactorily with hot-mix asphaltic compositions. Under the press of heavy traffic the resultant compositions crack and lose whatever alleged anti-stripping function they possess. U.S. Pat. No. 2,469,728 describes another effort to improve the adhesion of the asphalt to the mineral aggregate consisting of mollusk shells in which the shells are first treated with a dilute solution of a strong mineral acid and the thus treated aggregate then coated with asphalt. Here again, such is limited to a cut-back asphalt as set forth in column 1."

By way of yet further illustration, one may use one or more of the compositions claimed in U.S. Pat. No. 5,064,571, the entire disclosure of which is hereby incorporated by reference into this specification. This patent claims (in claim 1 thereof) "Mixtures of amido-amines prepared by a process comprised of reacting at least one first component comprising at least one compound selected from the group consisting of mono- and dicarboxylic acids and acid esters, with a second component comprising polyoxyalkyleneamine bottoms products, where the reaction is conducted in the temperature range from about 25° to about 280° C. and at a pressure in the range from about atmospheric to about 200 psig."

By way of further illustration, U.S. Pat. No. 6,786,963, the entire disclosure of which is hereby incorporated by reference into this specification, discloses certain diamide compounds that may be used in the process of the instant invention. Claim 1 of this patent describes "1. A paving composition comprising a bituminous material and a diamide compound, wherein: the composition is substantially free of water; and the diamide compound is represented by [FIG. 6], if A is hydrogen, B is R2 NHR3 NH2; if A is R2 NH2, B is R3 NH2; R1 is a branched or straight-chain alkyl or aromatic or alkylaromatic group; and R2 and R3 are the same or different and are a branched chain alkyl, straight-chain alkyl, or —R—NH—R, in which R is a branched chain alkyl with about 1 to about 6 carbon atoms or a straight-chain alkyl with about 1 to about 6 carbon atoms." This patent also discloses that, in its background section, that "Asphalt compositions have relatively poor adhesion to mineral aggregates in the presence of water. Since the aggregate is preferentially wetted by water, even if the aggregate is dry at the time it is blended with the asphalt, the eventual penetration of water into the composition reaches the aggregate and interferes with the bond between the aggregate and the asphalt. The result of this stripping is flaked pavement and pot holes. Stripping problems also generally occur if the aggregate is poorly dried, if sandy carbonate aggregate containing a large amount of quartz particles is used, if carbonate aggregate is covered with dust, or if igneous (silicate) aggregates, such as granite, diorite, gabbro, diabase, or basalt, that strip in the presence of external water are used. To avoid such failures, adhesion improving agents known as "anti-stripping agents" are commonly added to the asphalt. Before the mixing operation, these agents are added to the bituminous binder to reduce its surface tension and to induce on the binder an electrical charge opposite to that of the aggregate surface. Lower surface tension gives improved wettability of the aggregate, and charge reversal enhances bond strength by increasing Coulomb's attractive forces."

U.S. Pat. No. 6,786,963 also discloses that "Cationic substances, particularly amines, have been traditionally used as anti-stripping agents. The cationic substances increase the hydrophobicity of the aggregate, making the aggregate resistant to the penetration of water so that water seeping into the asphalt does not tend to destroy the bond between the asphalt and the aggregate. The addition of the cationic substances tends to make the aggregate sufficiently water resistant that a good bond with the asphalt is formed. Among the cationic materials which have been used as adhesion promoters with asphalt are primary alkyl amines (such as lauryl amine and stearyl amine) and alkylene diamines (such as the fatty alkyl substituted alkylene diamines). Because these amines may rapidly lose their activity when combined with asphalt and stored at elevated temperatures for an extended period, it has therefore been necessary to combine the amine with the asphalt at the work site when the asphalt is combined with the aggregate, which in practice presents difficulties in obtaining a homogeneous mixture. It is also noted that these amines are generally corrosive and may have an unpleasant smell."

U.S. Pat. No. 6,786,963 also discloses that "Various asphalt formulations have been reported in attempts to enhance the properties of paving compositions while avoiding the above-described difficulties. U.S. Pat. No. 4,447,269 offers cationic oil in water type bituminous aggregate slurries. The emulsion comprises bitumen and a reaction product of a polyamine and a polycarboxylic acid, and water. Lime or cement can be added to reduce the setting time of the mixture."

As is also disclosed in U.S. Pat. No. 6,786,963, "U.S. Pat. No. 4,721,529 suggests the preparation and use of asphalt admixtures with the reaction product of an amine anti-strip and an acid salt. The acid salt is a divalent or trivalent metal salt of an inorganic acid. U.S. Pat. No. 5,443,632 suggests cationic aqueous bituminous emulsion-aggregate paving slurry seal mixtures. The emulsifier is the product of reaction of polyamines with fatty acids and rosin, and a quaternizing agent. U.S. Pat. No. 4,806,166 proposes preparation of an aggregate comprising asphalt and an adhesion improving amount of an anti-stripping agent comprising the aminoester reaction product of a tall oil fatty acid and triethanolamine. The reaction product is of low viscosity, has good coating performance, and is inexpensive. U.S. Pat. No. 5,019,610 offers an asphalt composition comprising a blend of a thermoplastic rubber polymer and a fatty dialkyl amide, and asphalt cement. The preparation method requires only gentle stirring. The amide has a C6-C22 alkyl group attached to the carbonyl, and two C1-C8 alkyl groups attached to the amide nitrogen. The compositions offer good viscosities at relatively low residue percentages. The compositions are offered for use in road paving, asphalt roofing cements, mastics, moisture barriers, joint and crack fillers, and sheeting."

U.S. Pat. No. 6,786,963 also discloses that "U.S. Pat. No. 4,430,127 suggests preparation of a bitumen and epoxylated polyamine composition. The compositions provide improved adhesion between aggregate materials and the bitumen material. At least two of the amino nitrogen atoms are separated by six carbon atoms. U.S. Pat. No. 4,462,840 proposes use of a cation-active emulsifier which is the product of a polyamine and polycarboxylic acids. The emulsifier is useful in producing aqueous bituminous emulsion-aggregate slurries."

By way of yet further illustration, U.S. Pat. No. 6,875,341 describes and claims the use of certain anti-strip agents; the entire disclosure of this United States patents is hereby incorporated by reference into this specification.

Claim 11 of U.S. Pat. No. 6,875,342 describes "11. A process for extraction of selected heteroatom-containing compounds from hydrocarbonaceous oil for use in commodity, specialty or industrial applications, the process comprising contacting the hydrocarbonaceous oil with a mixture of polar solvent and water to selectively recover heteroatom-containing compounds into an extract fraction that contains low concentrations of non-heteroatom-containing compounds by use of a solvent and water mixture in a ratio to achieve a coefficient-of-separation of heteroatom-containing compounds that is greater than 65%, where the coefficient of separation is the mole percent of heteroatom-containing compounds from the carbonaceous oil that are recovered in the extract fraction minus the mole percent of non-heteroatom-containing compounds from the carbonaceous oil that are recovered in the extract fraction." An anti-strip agent made via this process is identified in claim 12, which states "12. The process of claim 11 wherein the extracted fraction containing high concentrations of heteroatom-containing compounds and low concentrations of non-heteroatom-containing compounds is used with little or no further processing as an anti-strip asphalt additive . . . ". Similarly, claim 13 of U.S. Pat. No. 6,875,341 discusses "13. The process of claim 11 wherein the extracted fraction containing high concentrations of heteroatom-containing compounds and low concentrations of non-heteroatom-containing compounds is used as a feedstock for manufacture of surfactants, pyridine N-oxides, quaternary pyridinium salts, asphalt anti-strip additives . . . "

By way of yet further illustration, one may use one or more of the anti-strip agents disclosed in U.S. Pat. Nos. 4,839,404 (bituminous compositions having high adhesive properties), 4,933,384 (bituminous materials), 4,975,476 (bituminous materials), 5,352,275 (method of producing hot mix asphalt), 5,558,702 (asphalt emulsions containing amphoteric emulsifier), 5,566,576 (asphalt emulsions), 5,660,498 (patching system and method for repairing roadways), 5,667,577 (filled asphalt emulsions containing betaine emulsifier), 5,755,865 (asphalt rejuvenator and recycled asphalt composition), 5,766,333 (method for recycling and rejuvenating asphalt pavement), 6,093,494 (anti-strip latex for aggregate treatment), 6,403,687 (anti-strip latex for aggregate treatment), and the like. The entire disclosure of each of these United States patents is hereby incorporated by reference into this specification.

In one preferred embodiment, the anti-strip agent is an organic amine, which may be primary, secondary, or tertiary, and which contains from about 1 to about 18 carbon atoms.

In one preferred embodiment, the anti-strip agent is an amido amine (fatty acid amine).

In one preferred embodiment, the anti-strip agent is comprised of 4,4'-methylenebiscyclohexanamine. Methylenebiscyclohexanamines are well known to those skilled in the art and are described, e.g., in U.S. Pat. Nos. 6,916,505; 6,004, 900; 5,648,407; 5,462,996; 5,405,686; 5,368,922; 5,276,106; and the like. The entire disclosure of each of these United States patents is hereby incorporated In another embodiment, the anti-strip agent is a biscyclohexanamine. Such materials are disclosed, e.g., in U.S. Pat. Nos. 6,474,028; 6,642,302; 5,968,952; 5,712,039; 4,694,051; and the like. The entire disclosure of each of these United States patents is hereby incorporated by reference into this specification.

In another embodiment, the anti-strip agent is comprised of mixed polycycloaliphatic amines.

In one preferred embodiment, in addition to or instead of the anti-strip agent, one may use an adhesion-promoting agent, such as, e.g., the adhesion agents described in U.S. Pat. No. 5,240,760, the entire disclosure of which is hereby incorporated by reference into this specification. As is disclosed in this patent (see from line 56 of column 4 to line 38 of column 5), "Suitable adhesion agents are compound(s) capable of promoting the adhesion of roofing granules to an asphalt-based substrate. Preferred adhesion agents are hydrophobic in nature, and do not significantly alter the color of the roofing granules. The adhesion agent should be compatible with the polysiloxane and the roofing granules' surfaces. Preferred adhesion agents are silicones other than those that have long-chain hydrocarbon groups. Preferred silicones are described in E. Schamberg, Adhesion, v. 29(11), pp. 20, 23-27 (1985), as well as in U.S. Pat. Nos. 4,486,476, 4,452,961, 4,537,595, and 4,781,950. These kinds of silicones can be purchased under the trademark TEGOSIVIN (particularly TEGOSIVIN HL100) from Goldschmidt Chemical Corporation, Hopewell, Va."

U.S. Pat. No. 5,240,760 also discloses that "Other adhesion agents that can be suitable include resin compositions R-20, R-24, R-27, R-270, and R-272, (Union Carbide Corporation, Danbury, Conn.), Wacker Silicone Resins MK, M-62 (Wacker-Chemi GMBA, Alemania, Germany), Dri-Sil™ 73, Dow Corning 1107, Dow Corning 477 Resin (Dow Corning Corporation, Midland, Mich.), SR-82 and SM 2138 available from General Electric, Schenectady, N.Y., and oleic acid, Witco Chemical Corporation, Chicago, Ill. Mixtures or combinations of adhesion agents may be employed."

U.S. Pat. No. 5,240,760 also discloses that "The adhesion agent is employed on the roofing granules' surfaces to an extent sufficient to promote granule adhesion to an asphalt-based substrate. The amount of adhesion agent can vary depending on the composition of the roofing granules and adhesion agent. Generally speaking, adhesion agents are employed at about 0.01 to 5 pounds per ton of roofing granules ($5 \times 10^{-4}$ to 0.25 weight percent). In the case of TEGOSIVIN silicones noted above, the adhesion agent is preferably applied to the roofing granules at about 0.5 to 1 lb. per ton of granules ($2.5 \times 10^{-3}$ to 0.05 weight percent), more preferably at 0.1 to 0.3 pound per ton (0.005 to 0.015 weight percent)."

U.S. Pat. No. 5,240,760 also discloses that "The polysiloxane and adhesion agent are preferably applied to the roofing granules as solutes in an oil solvent. The oil assists in spreading the polysiloxane and adhesion agent to the roofing granules' surfaces, and also helps reduce dust formation."

U.S. Pat. No. 5,240,760 also discloses that "When using an oil to apply the adhesion agent and polysiloxane to roofing granules' surfaces, the oil is employed at up to about 12 pounds per ton of roofing granules (0.6 weight percent) based on the weight of roofing granules, preferably 1 to 10 pounds per ton (0.05 to 0.5 weight percent), and more preferably 5 to 8 pounds per ton (0.25 to 0.4 weight percent)."

U.S. Pat. No. 5,411,803, the entire disclosure of which is hereby incorporated by reference into this specification, also describes adhesion agents. As is disclosed in such patent, "Adhesion to bituminous surfaces is also improved using ZFP and borate compounds. Adhesion is described in terms of wet and dry "pick tests", which are described in detail in the Test Methods Section. The dry and wet pick values have units of percent (%), with a higher number indicating better adhesion, a low number indicating cohesive failure of the bituminous surface to which the granule is adhered, rather than adhesive failure of the granule from the surface. Preferred values for dry pick are at least about 75%, whereas for wet pick the value is at least about 50%, more preferably at least about 70%." (See column 7, lines 3-14.)

Certain adhesion tests are described in U.S. Pat. No. 5,411,803. As is described in such patent, "The pick test is a practical test to predict the adhesive characteristics of roofing granules toward asphalt. Sized granules were dropped into hot asphalt and when the asphalt had cooled to about room temperature; the granules were picked out of the asphalt. The granule surface which had been in contact with the asphalt was observed for the amount of asphalt adhering to it. If the surface of the granule was well coated with asphalt, the granule had a good "dry" pick test value. Any reading above 60% coverage of the contact surface is considered satisfactory. "(See column 12, lines 33-43.)"

U.S. Pat. No. 5,411,803 also discloses that "Effects of water upon adhesion were obtained by submerging the asphalt-granule combination under water for 18 hours. Afterwards, observation of the percent contact surface covered by asphalt was measured. Values above the 30% are considered excellent and values above 10% are considered satisfactory." (See column 12, lines 44-50.):

U.S. Pat. No. 5,411,803 also describes a "Pick Test," disclosing that "5 grams of prepared asphalt was placed in a can having approximate diameter of about 6 centimeters (cm). The asphalt and can were then placed in a dispatch oven at 176° C. for 10 minutes with full circulation of air. After 10 minutes the can was removed from the oven and tapped on a table top once to remove air bubbles. Granules to be tested were then sprinkled onto the top surface of the asphalt in the can from a height of 30.5 cm or more. The can was tapped on a table top three times to help embed the granules in the asphalt. The can, asphalt, and granules were then left undisturbed and allowed to cool to room temperature (approximately 0.5 hour)." (See column 13, lines 3-15.)

U.S. Pat. No. 5,411,803 also discloses that "The granules were first picked out of the cooled asphalt on a dry basis. Only those granules which were embedded well were examined. A picked granule was examined to estimate the amount of asphalt that was adhered to it. The estimate used a scale of 0-10, with "0" meaning no asphalt adhered to the granule and "10" meaning that the part of the granule embedded in the asphalt was completely covered. Ten granules were picked out of the asphalt for each of the 3 different times (dry, 2 hours, and 18 hours) and their total recorded in percent." (See column 13, lines 16-27)"

U.S. Pat. No. 5,411,803 also discloses that "For the wet pick test, the procedure was to submerge the granule covered asphalt in the same can for two hours under 0.64 cm distilled water at room temperature. The granules were then re-evaluated. The experiment is repeated for an additional 16 hours, and the granules further re-evaluated." (See column 13, lines 28-33.)

U.S. Pat. No. 5,411,803 also discloses that "When performing the pick test it was sometimes noted that the asphalt had a tendency to crack or break around the base of the granule. When this occurred, the test result was ignored. In some cases, especially when performing the wet pick tests, the can was held next to a microscope light for about 10 seconds (on the lid) and 12-13 seconds (on the bottom) to slightly warm the asphalt and prevent cracking." (See column 13, lines 33-41.)

Adhesion tests were also described in U.S. Pat. No. 5,427,793, the entire disclosure of which is hereby incorporated by reference into this specification. As is disclosed in such patent, "The rub test was used to predict the adhesive characteristics of roofing granules toward asphalt. The weight loss of an asphalt shingle due to granule loss after being rubbed was compared with the original weight of the shingle. If the weight loss is less than 0.1-0.3 gram the shingle is considered to pass the test." (See column 10, lines 37-42.)"

U.S. Pat. No. 5,427,793 also discloses that "Effects of water upon adhesion were obtained by submerging the asphalt shingle to be tested in distilled water at room temperature (about 20° C.) for periods of 1 and 7 days. Afterwards, observation of the weight loss from the shingles was determined as in the dry rub test (after the wet shingles were towel dried and then air-dried for 1-2 minutes. Weight loss values of 1 gram or less are considered satisfactory." (See column 10, lines 38-50.)

Referring again to FIG. 3, and in the preferred embodiment depicted therein, the anti-strip agent (and/or the adhesion agent) is mixed in mixer 144 with the particulate material (from line 138) and with an oil, such as, e.g., a naphthenic mineral oil.

Naphthenic mineral oils contain a significant proportion of naphthenic compounds, and they are well known to those skilled in the art. Reference may be had to the following United States patents which refer to "napthenic mineral oil" in their claims: 3,980,448 (organic compounds as fuel additives), 4,101,429 (lubricant compositions), 4,180,466 (method of lubrication of a controlled-slip differential), 4,324,453 (filling material for electrical and light waveguide communications cables), 4,374,168 (metalworking lubrication), 4,428,850 (low foaming lubricating oil compositions), 4,510,062 (refrigeration oil composition), 4,676,917 (railway diesel crankcase lubricant), 4,720,350 (oxidation and corrosion inhibiting additives for railway diesel crankcase lubricants), 4,793,939 (lubricating oil composition containing a polyalkylene oxide additive), 4,781,846 (additives for aqueous lubricant), 5,460,741 (lubricating oil composition), 5,547,596 (lubricant composition for limited slip differential of a car), 5,658,886 (lubricating oil composition), 6,063,447 (process for treating the surface of metal parts), 6,245,723 (cooling lubricant emulsion), 6,482,780 (grease composition for rolling bearing), 6,736,991 (refrigeration lubricant for hydrofluorocarbon refrigerants), and the like. The entire disclosure of each of these United States patents is hereby incorporated by reference into this specification.

It is preferred that the ratio of the oil/anti-strip agent used is from about 10/90 to about 90/10 weight percent. In one embodiment, from about 0.8 to about 1.5 pounds of such oil is added for each 2,000 pounds of the limestone granules in mixer 144. In another embodiment, from about 0.8 to about 1.5 pounds of a mixture of such oil and one or more of the aforementioned anti-strip agent is added for each 2,000 pounds of the limestone granules in mixer 144.

In another embodiment, from about 1 to about 3 parts of oil are preferably used for each part of the anti-strip compound. In one aspect of this embodiment, from about 1.5 to about 2.5 parts of oil are used for each part of the anti-strip compound.

In one embodiment, from about 0.5 to about 2.0 gallons of such oil, and from about 0.5 to about 1.0 gallons of such anti-strip compound are added for each ton of the limestone granules.

In one embodiment, a sufficient amount of oil and anti-strip agent is charged via line 146 to form a coating on the particulate matter in mixer 144 that is from about 200 to about 2,000 nanometers and, preferably, from about 300 to about 1200 nanometers.

In one preferred embodiment, a blend of the oil and the anti-strip compound is sprayed onto the limestone granules as such granules are being transferred through a blending screw. The rate of addition is preferably based on the rate of the atomizer as it relates to the rate of the material being transferred through the blending screw.

In one preferred embodiment, and referring again to FIG. 3, from about 0.001 to about 4 parts (by weight) of such oil, and from about 0.001 to about 4 parts (by weight) of such anti-strip agent, are charged to mixer 44 for each 100 parts of particulate in such mixer. In one aspect of this embodiment, less than 2 weight percent of each of the oil and the anti-strip agent are used. In another aspect of this embodiment, less than 1 weight percent of each of the oil and the anti-strip agent are used. In yet another embodiment, less than about 0.5 weight percent of each of the oil and the anti-strip agent are used.

The oil and the anti-strip agent are preferably mixed with the granules in mixer 144 which, in one embodiment, is comprised of a blending screw. One may use any of the blending screws known to those skilled in the art. Reference may be had, e.g., to U.S. Pat. Nos. 3,881,708 (mixing extruders), 3,938,469 (apparatus for coating particulate material with finely divided solids), 5,573,331 (multiple-stage screw for blending materials), and the like. The entire disclosure of each of these United States patents is hereby incorporated by reference into this specification.

Samples may be periodically withdrawn from the mixer 144 via line 148 to be tested in laboratory 140 and to determine whether the coated particles have met the specification.

In one embodiment, the coated particles of this invention are tested to determine whether they have the required degree of hydrophobicity. One may utilize the assembly 100 depicted in FIG. 5 for this purpose.

Figure 5:
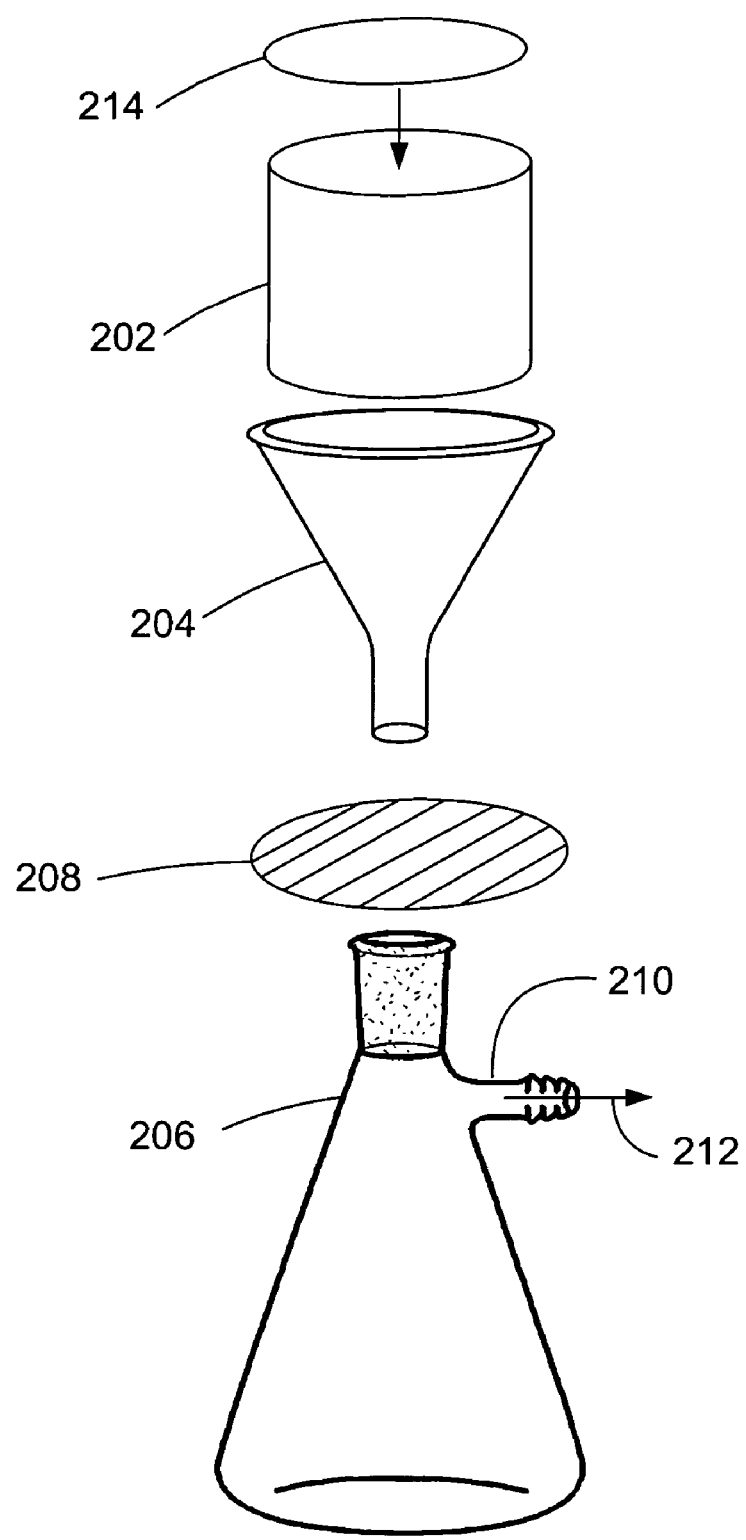
FIG. 5 is a schematic of a test apparatus for determining the hydrophobicity of the coated particles of this invention.

Referring to FIG. 5, and in the preferred embodiment depicted therein, the assembly 200 tests material for its ability to resist moisture adsorption in the accordance with the procedure described below. Prior to conducting the test, all of the materials and the equipment are preferably dried until they are substantially moisture free.

Utilizing a 5.5 centimeter round flat bottomed filter case 202 and an accompanying fitted funnel bottom 204, one may assemble apparatus onto a rubber-stoppered Buchner flask 206. In the embodiment depicted, a rubber disk 208 is disposed on top of the Buchner flask 206 in order to seal the vacuum applied to such flask.

Referring again to FIG. 5, the vacuum is pulled through port 210 in the direction of arrow 212 via a vacuum pump (not shown)

While pulling a vacuum on the apparatus via vacuum pump (not shown), one should wet a filter pad 214 (such as, e.g., a Whatman 40 gravimetric analysis filter pad) with water until fully wetted. Thereafter, one should allow the vacuum to remove free moisture from the filter pad.

Thereafter, one should remove the flat bottomed filter case 202 and wetted filter pad; remove any free moisture from the bottom side of the filter assembly, weigh the assembly, and record the weight. Fifty (50) grams of the granular material to be tested should be weighed to the nearest $100^{th}$ of a gram. This material should then be transferred to the filter assembly without moving the filter pad on the bottom of the assembly, and one should gently tap the 50 grams of material to flatten out the sample. Thereafter, weigh 100 grams of distilled water to the nearest $100^{th}$ of a gram. Carefully, to avoid causing dimpling of the sample, pour the 100 grams of water onto the 50 grams of material which has been assembled back onto the top of the funnel assembly and is under vacuum. This may require multiple pouring depending on the available of the filter assembly. Allow the vacuum to continue pulling the water through the material and through the filter pad. When the water stops coming from the filter (end point is reached when water is not visible on top of the sample and water has stopped being seen on the end of the funnel assembly for 30 seconds), break vacuum and remove filter assembly from the funnel assembly. Remove any free moisture from the bottom of the filter assembly and weigh the filter assembly once again, this time including the weight of the wet sample. Record this weight.

The weight of final assembly−(weight of dry filter assembly and wetted filter+weight of sample)=amount of water adsorbed onto the surface of the sample. This final weight of absorbed water is the reported value and can be reported as an absolute value or as a percentage of the weight of the sample being tested.

Testing has shown that performing this test on treated and untreated limestone granules in the 10-30 mesh range often show values as described below. The untreated limestone will often absorb 2.6 grams of water, which is 4.2 percent of the weight of the 50 gram sample. The treated limestone, by comparison, will often absorb only 1.05 grams, which is only 2.1 weight percent of the 50 gram sample.

In one embodiment, and referring again to the coated particles produced in mixer 144 of FIG. 3, the Moh's hardness of the coated particles from about 2.5 to about 3.5 and is often from about 2.9 to about 3.1. It should be noted that calcite, which is the predominant component of limestone, is 3.0 on the Moh's scale.

In one embodiment, the adhesion of the coated granules removed via line 148 (see FIG. 3) is tested by a procedure in which the granules are incorporated into a roofing shingle and the shingle is tested in accordance with ASTM standard test D 4977-03. Test sample strips used to determine the adhesive characteristics of the coated granule particles under ASTM 4977-03 are constructed in the conventional manner of manufacture of a roofing shingle, utilizing a typical petroleum based roofing asphalt which as been oxidized by blowing with air at a temperature of approximately 500 degrees Fahrenheit, with a final Ring & Ball softening point of between 195 degrees Fahrenheit and 215 degrees Fahrenheit as determined by ASTM D 36, and a needle penetration of between 17 decimillimeters and 23 decimillimeters (at 77 degrees Fahrenheit), as determined by ASTM D 5, this material typically referred to in the trade as asphalt shingle coating.

A commercially available bonded non-woven glass roofing fabric with a dry weight of approximately 92-95 grams/square meter, consisting of sized individual "E" glass filaments of 15.25-16.5 microns in diameter ("M" fiber) and from 0.75-1.25 inches in length, which are randomly oriented and bonded with a modified urea-formaldehyde resin binder, which has been applied to a level of 20 percent (dry weight), is coated on each side and saturated with a roofing asphalt compound consisting of asphalt shingle coating containing at least 65 percent of a mineral filler such as limestone or stone dust, such compound typically referred to in the trade as filled asphalt coating. The asphalt coated sheet is allowed to cool to room temperature.

The asphalt coated sheet is conditioned, preferably in an oven at 150 degrees Fahrenheit for 30 minutes. After conditioning, samples of granule particles produced in the process depicted in FIG. 3 are applied to the top surface of the warm sheet by gravity feed, and the granules particles are roll pressed into the sheet with a roll pressure of between 10 pounds per square inch and 15 pounds per square inch. The finished sheet is allowed to cool to room temperature and is then cut into 2 inch by 9 inch sample specimens for further testing under ASTM D 4977-03. All loose granule particles are removed from the samples by gentle tapping of the specimen At least two sample specimens are cut for each trial, with the long dimension of the specimen in the machine direction. Specimens are conditioned at room temperature of 23 degrees Celsius plus or minus 2 degrees Celsius (73.4 degrees Fahrenheit plus or minus 3.6 degrees Fahrenheit) for at least 30 minutes before testing. Granule abrasion tests are done using a Granule Test Apparatus as described in ASTM standard test D 4977-03. All loose granules are removed from the specimens by gentle tapping of the sample. Each specimen is weighed to the nearest 0.01 grams and a record is made of the initial weight of the specimen. The specimen is centered in the sample holder of the Test Apparatus with the mineral surface facing up and the long axis of the specimen aligned with the brush stroke of the Test Apparatus. The Test Apparatus is activated such that the specimen is abraded 50 complete cycles, each cycle consisting of a forward stroke and a back stroke, with the brush travel remaining parallel to the long axis of the specimen. The specimen is removed from the sample holder and any loose granules are removed from the sheet by gently tapping the sample. The specimen is weighed to the nearest 0.01 grams and a record is made of the final weight of the specimen. The difference in weights for multiple samples of the same specimen are calculated and averaged to determine the average granule loss by abrasion. Losses of more than 1.0 gram per specimen are considered excessive and represent poor granule adhesion.

In one embodiment, the wettability of the particles in mixer 144 is tested by a contact-angle measurement test, representing the covering of the surface of the particles with the amine or with the asphalt coating.

In another preferred embodiment, the wettability of such particles is determined in accordance with U.S. Pat. No. 5,427,793, which discloses that "This test was used to determine the completeness of distribution of tin-acrylate polymeric binders applied to roofing granules by trying to adhere asphalt to the granules while stirring in water."

U.S. Pat. No. 5,427,793 also discloses that "First, an asphalt was prepared that was soft enough to pour readily at about 15° C., by adding 13 parts of a Mid-Continent 54.5° C. melt point asphalt saturant to 10 parts by weight of 635 oil. The mixture was then heated with stirring at a temperature not exceeding about 120° C., until the asphalt became thoroughly dissolved in the oil. The mixture was allowed to cool before using."

U.S. Pat. No. 5,427,793 also discloses that "To an estimated quantity of 10 grams of granules in a 100 milliliter ("ml") beaker was added about 50 ml of water. With a suitable spatula about 2 grams of asphalt was placed into the granules-water mixture and stirred for one minute, constantly attempting to coat the granules with asphalt. While the whole mass of granules and asphalt was under water and after cessation of stirring, the percentage of total granule surface coated by the asphalt was then estimated. Also estimated was the percentage of loose granules lying in the bottom of the beaker which are entirely uncoated with asphalt. Both percentages are reported. For example, if the percent of total granule surface covered (including loose granules) was 75% and the percent of loose granules in the bottom of the beaker was 4%, the figures reported were 75-4."

U.S. Pat. No. 5,427,793 also discloses that "At the end of five minutes, the mass was observed again and the percentages estimated again. Reported are the lower of the two sets of figures. Well-treated granules lie in the range of 90-100 percent with no loose granules." (See column 10, lines 3 to 34.)

In one embodiment, the pH of the coated particles in mixer 144 is from about 8 to about 10 and, more preferably, from about 9 to about 10.

Referring again to FIG. 3, after the coated particles in mixer 144 have the desired combination of properties, they are conveyed via line 150 to mass flow silo 152. Such a mass flow silo is well known and is described, e.g., in the claims of U.S. Pat. Nos. 4,818,117 (apparatus for mixing bulk materials in dust, powder, or coarse grained form), 6,547,948, and the like. The entire disclosure of each of these United States patents is hereby incorporated by reference into this specification.

Preparation of a Roofing Shingle

Referring again to FIG. 3, and in one preferred embodiment depicted therein, in step 156 roofing shingles are prepared with the coated granules disposed in mass flow silo 152.

One may use the process disclosed in U.S. Pat. No. 4,274,243, the entire disclosure of which is hereby incorporated by reference into this specification. Claim 1 of this patent describes "1. A method of forming a laminated roofing shingle comprising: (a) providing an indefinite length of asphalt-impregnated, felted material; (b) adhering a coating of mineral granules to at least one surface of said felted material; (c) cutting said material in a repeating pattern along the longitudinal dimension of said material so as to form an interleaved series of tabs of pairs of overlay members, each said tab, defined by said step of cutting, being of substantially identical shape and the lower edge of each said tab being defined by a smoothly curving negatively contoured edge; (d) making pairs of underlay members in a similar manner as above but wherein the lower edges of the underlay members are defined by a substantially continuously curving sinuous cut having a uniform periodic shape and amplitude such that each pair of underlay members thus formed are substantially identical; and (e) laminating said underlay members to said overlay members so as to form a series of shingles having substantially the same overall shape, wherein said step of laminating further includes the step of positioning said negatively contoured edge of each said tab directly over a substantially correspondingly curving portion of the lower edge of each said underlay member so as to simulate a series of alternating ridges and valleys of a portion of a tile covered roof."

U.S. Pat. No. 4,634,622 also discloses that "Later, the industry began moving more to the use of fiberglass mats instead of the conventional organic fibrous mats or asbestos fiber mats. Because fiberglass mats are much more porous than the previously used mats, this change eliminated the need for asphalt saturant. Instead, filled asphalt previously used only for the coating layer was now used both to impregnate and to coat the mat. Thus the properties of the filled asphalt became more critical. In addition to its waterproofing and weather resistant characteristics, the filled asphalt had to contribute more to the strength of the product, providing stability against deformation at roof temperatures and withstanding stresses encountered in the manufacturing process. Also, it had to adequately resist stresses due to handling by workmen and encountered by environmental conditions such as wind loading and thermal stresses."

U.S. Pat. No. 4,634,622 also discloses that "The filler which has been used by the industry is mineral in nature comprised, for example, of ground limestone, silica, and slate, trap rock fines, and the like, and is present in the asphalt in substantial amounts. Typically, the filler used in these conventional roofing products has a specific gravity of between about 2.5 and about 3, which is several times more dense than the asphalt which it extends or displaces (the specific gravity of asphalt is about 1.0). Thus a filler content of about 60% by weight yields a filled asphalt having a specific gravity of about 1.7."

U.S. Pat. No. 4,634,622 also discloses that "The demand for fiber glass based asphalt roofing products has increased greatly since they were first introduced, to the point where they are now the standard product in the industry. During that time, however, their physical characteristics have remained substantially the same while their cost has risen with the rise in costs of their component elements. While it would of course be desirable to produce roofing products of at least as high quality at a lower cost, it is apparent that this goal has not been attained to any significant degree. The length of time that has passed since the introduction of fiber glass based asphalt roofing products is indicative that the problems which must be overcome in order to achieve this goal are considerable."

One may use the process described in U.S. Pat. No. 5,411,803 to make the roofing shingle. As is disclosed in such patent, "Bituminous sheet materials such as roofing shingles may be produced using the granules of the invention. Roofing shingles typically comprise materials such as felt, fiberglass, and the like. Application of a saturant or impregnant such as asphalt is essential to entirely permeate the felt or fiberglass base. Typically, applied over the impregnated base is a waterproof or water-resistant coating, such as asphaltum, upon which is then applied a surfacing of mineral granules, which completes the conventional roofing shingle." (See column 9, lines 47-57.)

Asphalt is preferably used to making the roofing shingles. As is disclosed on page 71 of George S. Brady et al.'s Materials Handbook, Twelfth Edition (McGraw-Hill Book Company, New York, N.Y., 1986), asphalt is "a bituminous, brownish to jet-black substance, solid or semi-solid, found in various parts of the world. It consists of a mixture of hydrocarbons, is fusible and largely soluble in carbon disulfide. It is also soluble in petroleum solvents and turpentine. The melting points range from 32 to 38 degrees C. Large deposits occur in Trinidad and Venezuela. Asphalt is of animal origin, as distinct from coals of vegetable origin. Native asphalt usually contains much mineral matter; and crude Trinidad asphalt has a composition of about 47% bitumen, 28% clay, and 25% water. Artificial asphalt is a term applied to the bituminous residue from coal distillation mechanically mixed with sand or limestone."

Asphalt is also described in the claims of various United States patents, such as, e.g., U.S. Pat. Nos. 3,617,329 (liquid asphalt), 4,328,147 (roofing asphalt formulation), 4,382,989 (roofing asphalt formulation), 4,634,622 (lightweight asphalt based building materials), 4,895,754 (oil treated mineral filler for asphalt), 5,217,530 (asphalt pavements), 5,356,664 (method of inhibiting algae growth on asphalt shingles), 5,380,552 (method of improving adhesion between roofing granules and asphalt-based roofing materials), 5,382,449 (method of using volcanic ash to maintain separation between asphalt roofing shingles), 5,511,899 (recycled waste asphalt), 5,516,573 (roofing materials having a thermoplastic adhesive interface between coating asphalt and roofing granules), 5,746,830 (pneumatic granule blender for asphalt shingles), 5,776,541 (method and apparatus for forming an irregular pattern of granules on an asphalt coated sheet), 5,795,622 (method of rotating or oscillating a flow of granules to form a pattern on an asphalt coated sheet), 6,095,082 (apparatus for applying granules to an asphalt coated sheet to form a pattern having inner and outer portions), 6,358,319 (vacuum treatment of asphalt coating), 6,358,319 (magnetic method and apparatus for depositing granules onto an asphalt-coated sheet), 6,465,058 (magnetic method for depositing granules onto an asphalt-coated sheet), and the like. The entire disclosure of each of these United States patents is hereby incorporated by reference into this specification.

Manufacture of a Standard Shingle

Applicants' claimed mineral filler and applicants' claimed mineral filler composition, have specified functional properties when incorporated into a glass mat and made into a shingle in accordance with a specified standard procedure. This specified standard procedure is described hereinbelow.

In the first step of this standard process, "oxidized asphalt" is made from a roofing flux by conventional means. One may use, e.g., the air oxidation process described, e.g., in U.S. Pat. No. 4,569,389, the entire disclosure of which is hereby incorporated by reference into this specification. Reference also may be had, e.g., to U.S. Pat. Nos. 4,511,411 (method and composition of asphaltic roofing fluxes) and 5,712,033 (asphalt-containing organic fibers), the entire disclosure of each of which is hereby incorporated by reference into this specification.

Referring to U.S. Pat. No. 4,659,389, it is disclosed that "The production of oxidized asphalt by blowing air through petroleum residue or straight run asphalt at elevated temperatures is well known in the art of petroleum refining. Such a procedure has a decided effect upon the physical properties of asphalt. In general, this technique serves to increase the hardness, softening point, pliability and weathering resistance of asphalt and decreases its ductility and susceptibility to changes with temperature. Oxidized asphalts show better pliability than straight reduced products, when both are of equal hardness. It is to be noted that the hardness of the straight run asphalt may be greatly increased by extensive steam or vacuum distillation of the asphalt, but the resulting product is more susceptible to temperature than air-blown asphalt."

U.S. Pat. No. 4,659,389 also discloses that "The air-blowing technique, in comparison with the vacuum distillation method, is capable of producing an asphaltic product of greater pliability but of the same hardness as the asphaltic product produced by vacuum distillation of the same straight run asphalt. As a result of their very desirable hardness, pliability and weathering resistance qualities, oxidized asphalts have become popular in the production of roofing asphalts, protective coatings, electrical insulating compositions, molded articles, and the like."

U.S. Pat. No. 4,659,389 also discloses that "Air-blowing in the presence of certain catalysts has been found to increase the rate at which the improved asphaltic properties can be achieved, and in some cases, modified the resulting product to have better properties than could otherwise be achieved by air-blowing without such catalysts."

U.S. Pat. No. 4,659,389 also discloses that "In U.S. Pat. No. 2,317,150 (1943), there is disclosed a composition comprising a blend of an oxidized precipitated asphalt having a high asphaltenes content of 45% to 65% plus a suitable flux capable of forming a complete and stable dispersion. Such fluxes usually contain a high aromatic content. An example of the suitable flux would be a mixture of heavy extract and a lubricating oil distillate. Precipitated asphalts are disclosed to be obtained in general from asphaltic crude that have been freed of their lightest components by distillation."

In U.S. Pat. No. 2,276,155 (1939), there is disclosed a process comprising separating an asphalt fraction into components comprising asphaltenes, resins and an oil, and subsequently blending the oil with the asphaltenes in desirable proportions to yield a feedstock to be air-blown into a finished product. The term "asphaltenes" is defined to be those components of topped residuum which are insoluble in propane and insoluble in petroleum ether. The term "resins" includes those constituents of topped residuum which are insoluble in propane but soluble in petroleum ether. The term "oil" comprises those components present in topped residuum which are soluble in both propane and petroleum ether."

U.S. Pat. No. 4,659,389 also discloses that "In U.S. Pat. No. 3,607,334 (1971), there is disclosed an asphaltic composition comprising as a major amount of asphalt and a minor amount of a second pass foots oil derived from heavy lube distillate. The second pass foots oil is derived from de-oiling slack wax removed from heavy lube oil distillates in the manufacture of high viscosity distillate lubricating oils. The foots oil comprises, in general, about 55 to 65 wt % in paraffins, about 0 to 4 wt % isoparaffins, about 30 to 45 wt % naphthenes and about 1% aromatics. The compositions described above can be used as a felt saturant and also as a starting material in the air-blowing process for making roofing material."

U.S. Pat. No. 4,659,389 also discloses that "In U.S. Pat. No. 4,052,290 (1977), there is disclosed an improved asphalt composition made from a blend of marginal asphalt stock and coal-derived asphaltenes. The blended composition is then air-blown to a final product. Conventional air-blowing conditions are asserted to be described in U.S. Pat. Nos. 2,767, 102; 3,462,359; and 3,707,388. In a typical air-blowing procedure, an air rate of about 1.2 to 3.5 cubic feet per hour per pound of charge is employed under atmospheric pressure at a temperature in the range of between about 204° C. (400° F.) to about 427° C. (800°)"

As will be apparent, the patents cited in U.S. Pat. No. 4,659,389, the disclosure of each of which is hereby incorporated by reference into this specification, teach those skilled in the art how to make oxidized asphalt with specified properties. Some or all of these techniques may be used to make the oxidized asphalt used in the standard test described in this section of the specification.

In such standard test, it is preferred to start with as asphalt roofing flux with a softening point of from about 90 to about 105 degrees Fahrenheit, a flash point of from about 550 degrees Fahrenheit to about 620 degrees Fahrenheit, and a viscosity (at 210 degrees Fahrenheit) of from about 300 centipoise to about 2500 centipoise. Thus, e.g., one may use the asphalt roofing flux sold by the BP Amoco Corporation (of Whiting, Ind.) as "Roofing Flux." Such roofing flux has a softening point of 97 degrees Fahrenheit, a penetration (at 32 degrees Fahrenheit) of 67 decimillimeters, and a viscosity (at 210 degrees Fahrenheit) of 565 centipoise, and a flash point of 640 degrees Fahrenheit.

Referring again to such standard test, after the specified roofing flux has been obtained, is it air oxidized in accordance with the procedures described hereinabove to obtain an oxidized asphalt with a penetration (at 77 degrees Fahrenheit) of 17 decimillimeters with a viscosity (at 400 degrees Fahrenheit) of 240 centipoise and a flash point of 620 degrees Fahrenheit and a softening point of 209 degrees Fahrenheit. As will be apparent to those skilled in the art, the specified roofing flux is indirectly heated to a temperature of 500 degrees Fahrenheit while being contacted with hot air at a temperature of 500 degrees Fahrenheit until the oxidized asphalt reaches a softening point of 209 degrees Fahrenheit. The softening point of the oxidized asphalt is preferably determined in accordance with ASTM D 36-95 ("Standard Test Method for softening point of Bitumen [Ring and Ball Apparatus]);" and the penetration of the oxidized asphalt is preferably determined in accordance with ASTM D 5-05 ("Standard Test Method for Penetration of Bituminous Materials.")

Once the standard oxidized asphalt has been obtained, it is mixed with the mineral filler to be tested, which preferably is the coated limestone mineral filler of this invention.

The mineral filler has been mined and processed by methods previously discussed herein, consisting of feeding the raw stone through a primary crusher and secondary crusher to yield material <1.5 inches. Any oversized materials are sent to an impactor and re-sorted to assure 100% <1.5 inches. This material is separated into feed for two different systems which make asphalt filler material (85-200 mesh) (AKA $^{85}/_{200}$ grade).

One system uses a roller mill which is fed directly with the minus 1.5 inch material. This material is ground between a fixed bull ring and a series of suspended weights which are rotated within this bull ring. An air stream picks up the ground material which is separated via an internal separator within the mill. The desired sized material is collected from the air stream via either cyclone collection or by a dust collector.

The other manufacturing method used to make $^{85}/_{200}$ is as follows. The minus 1.5 inch material is sent to a tertiary crusher which produces material <⅜ of an inch. This material is sent across a series of screens. One fraction of this screened material is a minus 16 mesh material. This minus 16 mesh material is run through an air separator. Two separate streams are generated here with the coarser stream being material between 16 mesh and 120 mesh, and the finer stream being the $^{85}/_{200}$ stream.

In one preferred embodiment, a blend of naphthenic oil and the preferred amine compound is applied to the limestone as such particles of filler are being transferred through a blending screw, ribbon blender or dual screw blending extruder. The rate of addition is preferably controlled in relation to the rate of the material being transferred through the blending process.

In one preferred embodiment, and referring again to FIG. 3, from about 0.001 to about 4 parts (by weight) of such oil, and from about 0.001 to about 4 parts (by weight) of such amine, are charged to mixer 44 for each 100 parts of particulate in such mixer. In one aspect of this embodiment, less than 2 weight percent of each of the oil and the amine are used. In another aspect of this embodiment, less than 1 weight percent of each of the oil and the amine are used. In yet another embodiment, less than about 0.5 weight percent of each of the oil and the amine are used.

The oil and the amine are preferably mixed in mixer 144 which, in one embodiment, is comprised of a blending screw. One may use any of the blending methods known to those skilled in the art.

Samples may be periodically withdrawn from the mixer 144 via line 148 to be tested in laboratory 140 and to determine whether the coated particles have met the specification.

In one embodiment, the coated particles of this invention are tested to determine whether they have the required degree of hydrophobicity, representing the level of application of the oil and the amine compound. One may utilize the assembly 100 depicted in FIG. 5 for this purpose.

Referring to FIG. 5 and in the preferred embodiment depicted therein, the assembly 200 tests material for its ability to resist moisture adsorption in the accordance with the procedure described below. Prior to conducting the test, all of the materials and the equipment is preferably dried until substantially moisture free.

Utilizing a 5.5 centimeter round flat bottomed filter case 202 and an accompanying fitted funnel bottom 204, one may assemble apparatus onto a rubber-stoppered Buchner flask 206. In the embodiment depicted, a rubber disk 208 is disposed on top of the Buchner flask 206 in order to seal the vacuum applied to such flask.

Referring again to FIG. 5, the vacuum is pulled through port 210 in the direction of arrow 212 via a vacuum pump (not shown)

While pulling a vacuum on the apparatus via vacuum pump (not shown), one should wet a filter pad 214 (such as, e.g., a Whatman 40 gravimetric analysis filter pad) with water until fully wetted. Thereafter, one should allow the vacuum to remove free moisture from the filter pad.

Thereafter, one should remove the flat bottomed filter case 202 and wetted filter pad; remove any free moisture from the bottom side of the filter assembly, weigh the assembly, and record the weight. Fifty (50) grams of the material to be tested should be weighed to the nearest 100th of a gram. This material should then be transferred to the filter assembly without moving the filter pad on the bottom of the assembly, and one should gently tap the 50 grams of material to flatten out the sample. Thereafter, weigh 100 grams of distilled water to the nearest 100th of a gram. Carefully, to avoid causing dimpling of the sample, pour the 100 grams of water onto the 50 grams of material which has been assembled back onto the top of the funnel assembly and is under vacuum. This may require multiple pouring depending on the available of the filter assembly. Allow the vacuum to continue pulling the water through the material and through the filter pad. When the water stops coming from the filter (end point is reached when water is not visible on top of the sample and water has stopped being seen on the end of the funnel assembly for 30 seconds), break vacuum and remove filter assembly from the funnel assembly. Remove any free moisture from the bottom of the filter assembly and weigh the filter assembly once again, this time including the weight of the wet sample. Record this weight.

The weight of final assembly–(weight of dry filter assembly and wetted filter+weight of sample)=amount of water adsorbed onto the surface of the sample. This final weight of absorbed water is the reported value and can be reported as an absolute value or as a percentage of the weight of the sample being tested.

Testing has shown that performing this test on treated and untreated limestone particulates in the 10-30 mesh range often show values as described below. The untreated limestone will often absorb 5 grams of water, which is 10 percent of the weight of the 50 gram sample. The treated limestone, by comparison, will often absorb only 2.5 grams or less, which is only 5 weight percent of the 50 gram sample.

The treated filler is added to asphalt coating at a temperature of between 450 degrees Fahrenheit and 500 degrees Fahrenheit and mixed until a uniform composition is obtained. A large scale high speed intensive mixer can be used to conduct the laboratory mixing of this composition. It is preferred to produce a mixture that contains from about 25 to about 29 weight percent of the oxidized asphalt mixed with the mineral filler (by combined weight of said asphalt and said mineral filler with a particle size smaller than 212 microns). In this preferred embodiment, at least 71 weight percent of the composition will be comprised of mineral filler with a particle size less than 212 microns.

Once the oxidized asphalt/mineral filler composition has been prepared, it is incorporated into a specified glass felt sheet. This specified glass felt mat is described elsewhere in this specification, and is a commercially available bonded non-woven glass roofing fabric with a dry weight of approximately 92-95 grams/square meter, and a thickness of about 30 mils, consisting of sized individual "E" Glass filaments of 15.25-16.5 microns in diameter ("M" fiber) and from 0.75-1.25 inches in length, which are randomly oriented and bonded with a modified urea-formaldehyde resin binder, which has been applied to a level of 20 percent (dry weight), is coated on each side.

Thereafter, the oxidized asphalt composition is used to saturate the specified glass felt sheet. In one embodiment, the glass felt sheet is immersed in the hot oxidized asphalt/mineral filler composition which is maintained at a temperature of from about 425 degrees Fahrenheit to about 475 degrees Fahrenheit; typically such immersion is effective to fully saturate the glass felt sheet in less than about 1 second and, more preferably, less than about 0.5 second.

The saturated glass felt sheet is then preferably compressed by squeeze rolls to both assure complete penetration and to remove excess asphalt/filler composition, and then it is allowed to cool to a temperature of about 200 degrees Fahrenheit. At this point, and for the standardized sample, the asphalt/filler material comprises 96 weight percent to 97 weight percent of the total weight of the saturated glass felt sheet.

Thereafter, and when the saturated glass felt sheet is at a temperature of between 150 and 200 degrees Fahrenheit, typical roofing granules 22 (see FIG. 1) are added to the top surface of the saturated glass felt sheet. In the this standardized test, the roofing granules are manufactured by the Minnesota Mining and Manufacturing Company of St. Paul, Minn., and they are sold "#11 Grade Roofing Granules" that are described as being "ceramic coated colored material" that meets the specifications of ASTM standard test D 451. These "mineral surface granules" are flooded over the top surface of the glass felt sheet, and the assembly thus produced is then pressed between two rollers at a pressure of from 10 to 15 pounds per square inch to fix the granules onto the top of the surface of the assembly.

After the roofing granules have been applied to the top surface of the assembly, sand (silicon dioxide) is applied to the bottom surface. This sand preferably has a particle size distribution such that at least 90 percent of its particles are smaller than 212 microns, and at least 24 percent of its particles are less than 106 microns. Such as and is commercially available and may be obtained, e.g., from Whibco Corporation of Port Elizabeth, N.J. as "Whibco P80."

The sand is also preferably applied to the hot impregnated asphalt/filler/glass sheet assembly, and to the back surface of such assembly to prevent sticking. Typically, the sand layer so affixed is less than 1 millimeter thick.

The aforementioned process is but one means by which one can prepare the impregnated glass felt assembly. Such assembly, in any event, will meet the requirements of ASTM standard test D 3462-05, which provides that (1) "4.3 The asphaltic material used to impregnate, laminate, and coat the glass felt, in any or all of these functions, is permitted to be compounded with a mineral stabilizer," (2) "7.1 The glass felt shall be uniformly encapsulated with asphalt and shall show no uncoated fibers," (3) "7.2 The weather surface shall be uniform in finish and may be embossed to simulate a grain texture. The mineral granules shall cover the entire surface and shall be firmly embedded in the asphalt coating. The granules may project into the mat to a limited degree. There shall be no damage to the mat by penetrating granules as determined after extraction." (4) "7.3 The finished shingles shall be free of visible defects . . . " (5) the test specimens, as required by section 8.1.2.1, " . . . shall be rectangular, 76 by 63 mm . . . " (6) "the test specimens are to be conditioned at from 21 to 25 degrees Celsius for at least 2 hours, and the tests are to be conducted at a temperature of from about 21 to about 25 degrees Celsius."

This coated glass felt roll is cooled to ambient temperature and the shingles, with desired cut-outs, are cut from the continuous shingle roll. The cutouts are slots of shingle material cut out of the exposure of a tabbed strip shingle. The cutouts are typically from about 0.37 to about 0.5 inches wide. Typically, the roll is three feet wide and shingles are one by three feet with cut-outs.

Mineral Filler Compositions

In this section of the specification, applicants will describe certain mineral filler compositions that may advantageously be used as filler for shingles.

One may use any of the mineral fillers known to those skilled in the art as starting materials in the coating process of this invention. Reference may be had, e.g., to U.S. Pat. Nos. 4,276,661 (mineral filler, method of preparation, and use thereof), 4,280,949 (modified polyester compositions containing mineral filler), 4,372,814 (paper having mineral filler for use in the production of gypsum wallboard), 4,421,678 (electrically conductive compositions comprising an ethylene polymer, a mineral filler, and an oiled, electrically conductive carbon black), 4,470,877 (paper having calcium sulfate mineral filler for use in the production of gypsum wallboard), 4,487,879 (filled arylene sulfide polymer compositions containing a glass filter in combination with a mineral filler), 4,661,164 (method of tinting a mineral filler), 4,876,291 (mineral filler fire retardant composition and method), 5,494,953 (polypropylene composition with high content of heavy mineral fillers), 5,676,729 (particulate urea with mineral filler incorporated for hardness), 6,177,499 (acrylic sheet having uniform distribution of coloring and mineral filler), 6,706,148 (method for fixing a mineral filler on cellulosic fibers), and the like. The entire disclosure of each of these United States patents is hereby incorporated by reference into this specification.

The mineral filler may be a mineral stabilizer. As is known to those skilled in the art, and as defined in ASTM standard test D 1079-05 ("Standard Terminology Relating to Roofing and Waterproofing"), a mineral stabilizer is a fine, water-insoluble inorganic material, used in admixture with solid or semisolid bituminous materials. Reference may be had, e.g., to U.S. Pat. Nos. 3,650,786 (oil well cement), 4,190,568 (mineral stabilized resin emulsion), 4,472,243 (sheet type roofing), 4,588,634 (coating formulation for inorganic fiber mat based bituminous roofing shingles), 4,952,268 (laminated waterproofing material containing asphalt), and 6,616,755 (self-leveling concrete). The entire disclosure of each of these United States patents is hereby incorporated by reference into this specification.

In the process of manufacture of the roofing shingle, and as described in section 4.2 of ASTM D 3462-05, "In the process of manufacture, one or more thicknesses of glass felt shall be impregnated with an asphaltic material. When more than one thickness of felt is used, the mats shall be adhered to each other with a continuous layer of asphaltic material between adjacent felts. The nature of the asphaltic material and the thickness of the adhering layers shall ensure a firm bond between adjacent glass felts. The single felt or laminated felts shall then be coated on both sides with a hot asphaltic coating."

The asphaltic material used to impregnate the glass felt preferably contains the mineral stabilizer of this invention. Thus, and is disclosed in section 4.3 of ASTM D 3462-05, "The asphaltic material used to impregnate, laminate, and coat the glass felt, in any or all of these functions, is permitted to be compounded with a mineral stabilizer. Glass fibers are permitted to be compounded with the asphalt in addition to, or instead of, the mineral stabilizer."

Section 4.4 of ASTM D 3462-05 provides that "All surfaces to be exposed to the weather . . . shall be surfaced with mineral granules embedded in the asphalt coating." Section 4.5 of such standard provides that "The reverse side shall be covered with a suitable material such as pulverized sand, talc, or mica to prevent the shingles from sticking together in the package." Section 4.6 of such standard provides that "The shingles shall have a factory-applied adhesive that will seal the shingles together after application when activated by heat and sunlight or be designed to be locked together during installation of the shingles."

Mixtures of Mineral Stabilizer

In one embodiment, the mineral stabilizer used in the process of this invention is a mixture of two different minerals with different particle sizes and/or particle size distributions and/or chemical compositions and/or physical properties. In one aspect of this embodiment, two or more minerals with different particle sizes and/or different particle size distributions are blended to obtain a blended mineral stabilizer with a specified particle size distribution. In another aspect of this embodiment, two more or distinct fractions of the same mineral are blended to form a blended mineral stabilizer with a specified particle size distribution.

The particle size distribution is designed to provide a fully filled void aggregate. Particle packing is a characteristic trait of materials with broad particle size distributions. The effort is made to generate a particle size distribution which contains an adequate number of materials sized to effectively fill those voids created by the coarsest component of the constituent blend. Mathematical theories make for optimum theoretical blends of materials which call for a multimodal mix of materials. These modes are relatable to one another as a blend of coarse components will produce a characteristic void volume within the matrix. Another mode of material can be therefore identified which will fill these voids while not reducing the intimate contact already in place between the coarse components. At the same time, this mode should not be comprised of materials which are too fine and require multiple parts of the fine component to fill the interstitial voids of the coarse components. This would increase the surface area of the total blend without gaining any increase in volume fill density.

Partially Treated Stabilizer

In one embodiment, the mineral stabilizer used in the process of this invention is a mixture of two different minerals with different particle sizes and/or particle size distributions and/or chemical compositions and/or physical properties. In one aspect of this embodiment, two or more minerals with different particle sizes and/or different particle size distributions are blended to obtain a blended mineral stabilizer with a specified particle size distribution. In another aspect of this embodiment, two more or distinct fractions of the same mineral are blended to form a blended mineral stabilizer with a specified particle size distribution. In another aspect of this embodiment, one or more of the mixture components have been treated with an oil and/or anti-strip agent as described elsewhere in this invention. In another aspect of this embodiment, one or more of the mixture components have not been treated with an oil and/or anti-strip agent.

The Hydrophobicity of the Mineral Stabilizer

In one preferred embodiment, and as described in more detail elsewhere in this specification, the mineral stabilizer used in the process of this invention has a specified degree of hydrophobicity. Fifty (50) grams of such mineral stabilizer, when tested in accordance with the procedure illustrated FIG. 5, will absorb less than 10.0 grams of water and, more preferably, less than about 5 grams of water

The Purity of the Mineral Stabilizer

In one preferred embodiment, the mineral stabilizer is comprised of limestone, and such limestone is comprised of at least about 90 weight percent of calcium carbonate. In one aspect of this embodiment, the mineral stabilizer is comprised of at least about 95 weight percent of calcium carbonate. Without wishing to be bound to any particular theory, applicants believe that such calcium carbonate may react with the asphalt to form more durable constructs, and that the use of high purity limestone facilitates the formation of such durable constructs.

The Particle Size Distribution of the Mineral Stabilizer, and its Concentration.

In one preferred embodiment, such "asphaltic material used to impregnate, laminate, and coat the glass felt" is " . . . compounded with a mineral stabilizer." In one aspect of this embodiment, such mineral stabilizer is limestone.

In one embodiment, the mineral stabilizer will have a sufficient number of its particles smaller than 212 microns that the weight of such fine particles is at least about 70 weight percent of the combined weight of such fine particles and asphalt; and the concentration of asphalt in such composition is preferably less than about 30 weight percent and, more preferably, less than about 29 weight percent.

In one embodiment, the mineral stabilizer will have a sufficient number of its particles smaller than 212 microns that the weight of such fine particles is at least about 71 weight percent of the combined weight of such fine particles and asphalt; and the concentration of asphalt in such composition will preferably be less than about 28 weight percent and, more preferably, less than about 27 weight percent.

In one embodiment, the mineral stabilizer will have a sufficient number of its particles smaller than 212 microns that the weight of such fine particles is at least about 72 weight percent of the combined weight of such fine particles and asphalt; and the concentration of asphalt in such composition will be less than about 26 weight percent and, more preferably, less than about 25 weight percent.

In one embodiment, the mineral stabilizer will have a sufficient number of its particles smaller than 212 microns that the weight of such fine particles is at least about 73 weight percent of the combined weight of such fine particles and asphalt.

In one embodiment, the mineral stabilizer will have a sufficient number of its particles smaller than 212 microns that the weight of such fine particles is at least about 74 weight percent of the combined weight of such fine particles and asphalt.

In one embodiment, the mineral stabilizer will have a sufficient number of its particles smaller than 212 microns that the weight of such fine particles is at least about 75 weight percent of the combined weight of such fine particles and asphalt.

In one preferred embodiment, the mineral stabilizer will have a sufficient number of its particles coarser than 70 microns such that the weight of such coarse fraction is at least 60 weight percent of the total weight of the mineral stabilizer.

In one preferred embodiment, the mineral stabilizer will have a sufficient number of its particles finer than 3.35 millimeters and coarser than 212 microns such that the weight of such is at least about 25 weight percent of the total weight of the mineral stabilizer.

In one preferred embodiment, less than about 2 percent of the particles in the mineral filler are coarser than 250 microns. In one aspect of this embodiment, less than about 1.5 percent of the particles in the mineral filler are coarser than 250 microns.

In one embodiment, at least 65 weight percent of the particles in the mineral filler are smaller than 74 microns.

In another embodiment, at least 80 weight percent of the particles in the mineral filler are smaller than 74 microns.

In yet another embodiment, at least 85 weight percent of the particles in the mineral filler are smaller than about 74 microns.

One may prepare any desired particle size distribution by conventional means. Thus, e.g., by way of illustration and not limitation, one may grind limestone and thereafter classify the various fractions. After such classification has occurred, one may then recombine selected fractions to produce the desired particle size distribution.

Properties of the Coated Mineral Filler

In one preferred embodiment, the mineral filler of this invention is comprised of a coating on such particulate matter with a thickness of from about 200 to about 2000 nanometers and, preferably from about 300 to about 1200 nanometers.

Means for providing such a coated filler material are described elsewhere in this specification.

Properties of the Asphalt Used in the Roofing Shingle

In one preferred embodiment, the asphalt used in the process of this invention is comprised of two or more blended oxidized asphalts.

In one preferred embodiment, the asphalt in the binder used in the process of this invention is replaced, in whole and/or part, with one or more asphalt modifiers. These asphalt modifiers are well known to those skilled in the art. Reference may be had, e.g., to U.S. Pat. Nos. 4,560,414 (modifier for paving asphalt), 5,393,819 (asphalt modifier), 5,399,598 (asphalt composition), 5,990,206 (asphalt modifier composition and asphalt composition), 6,503,968 (asphalt modifier of styrene-butadiene-styrene block copolymer), and the like. The entire disclosure of each of these United States patents is hereby incorporated by reference into this specification.

Reference also may be had, e.g., to Chapter 8 ("Polymeric Modifiers for Improved Performance of Asphaltic Mixtures") of Arthur M. Usmani's "Asphalt Science and Technology," Marcel Dekker, Inc., New York, N.Y. 1997).

In general, the asphalt binder that is used in the process of this invention may be replaced, in whole or in part, by one or more of the binder materials that are known to have been used in roofing shingles. Reference may be had, e.g., to U.S. Pat. Nos. 3,848,384 (composition shingle), 3,931,440 (roofing shingle using an asphalt composition), 4,273,685 (rubber modified asphalt compositions), 4,392,371 (asphalt compositions modified with organo-silane compounds), 4,301,851 (chemically modified asphalt compositions), 4,316,829 (modified asphalt composition), 4,322,928 (asphalt composition shingles), 4,332,705 (asphalt compositions modified with a rubbery polymer), 4,335,186 (chemically modified asphalt compositions), 4,338,231 (modified asphalt compositions), 4,349,388 (asphalt compositions modified with organo-silane compounds), 4,378,447 (cationic amine modified asphalt compositions), 4,384,073 (cationic alkenyl azabenzene chemically modified asphalts), 4,384,074 (cationic chemically modified asphalts), 4,394,481 (cationic acrylamide and rubber modified asphalts), 4,394,482 (modified asphalt composition), 4,404,316 (chemically modified asphalt compositions), 4,548,650 (diatomite-modified asphalt), 4,677,146 (modified asphalt compositions comprising a nitrogen derivative of an esterified copolymer), 4,833,184 (acrylate-modified asphalt), 4,850,844 (apparatus for making tapered plastic shingles), 4,868,233 (polyethylene modified asphalts), 5,019,610 (polymer-modified asphalts and asphalt emulsions), 5,059,300 (asphalts modified by solvent de-asphalted bottoms and phosphoric acid), 5,095,055 (acid treated polymer modified asphalts), 5,256,710 (phenolic-type polymer modified asphalts), 5,290,355 (roofing shingle composition), 5,331,028 (polymer modified asphalt compositions), 5,364,894 (emulsification of asphalt and modified asphalt with primary emulsifier polymers comprised of acrylic acid type monomers), 5,451,621 (SBS-modified asphalt-based material), 5,460,852 (polymer modified asphalt coating), 5,660,014 (composite shingle having shading zones in different planes), 5,571,596 (advanced composite roofing shingle), 5,851,276 (crumb rubber modified asphalt), 5,866,211 (rubber modified asphalt), 5,891,224 (rubber modified asphalt), 5,973,037 (styrene ethylene butylenes styrene copolymer rubber modified asphalt), 6,150,439 (polymer modified asphalt), 6,444,731 (modified asphalt), 6,569,925 (polymer modified asphalt), 6,713,539 (storage-stable modified asphalt compositions), 6,818,687 (modified asphalt with carrier and activator material), 6,884,431 (modified asphalt with partitioning agent), and the like. The entire disclosure of each of these United States patents is hereby incorporated by reference into this specification.

A Novel Shingle Product

In one preferred embodiment, a mineral filled shingle (such as, e.g., a limestone-filled shingle) is made in accordance with the procedure mentioned elsewhere in this specification, preferably using the glass mat and the asphalt material described. This asphalt material preferably contains at least 71 weight percent of limestone that is smaller than 212 microns, by combined weight of such limestone material and asphalt; and it also contains less than about 29 weight percent of asphalt. In one aspect of this embodiment, the asphalt material contains at least 72 weight percent of such limestone and less than 28 weight percent of such asphalt.

This novel shingle product, in spite of its relatively high concentration of mineral filler, when tested in accordance with ASTM Standard Test D 3462-05 ("Standard Specification for Asphalt Shingles Made from Glass Felt and Surfaced with Mineral Granules"), has a tear strength of at least 1700 grams.

Furthermore, when such novel shingle product is tested in accordance with ASTM D 4798-04 ("Standard Practice for Accelerated Weathering Test Conditions and Procedures for Bituminous Materials . . . "), Cycle A, the time to failure exceeds at least 30 days, and, and in one embodiment, the shingle still retains enough of its mechanical properties to still pass the tear strength test.

A related ASTM test, ASTM D 4799-00, is described in U.S. Pat. No. 6,562,119, the entire disclosure of which is hereby incorporated by reference into this specification. As is disclosed in this patent, "The above object, as well as others not specifically enumerated, are achieved by a method of improving the weathering of a bituminous coating according to the invention. The method comprises adding to the bituminous coating a microwave-produced carbon black in an amount sufficient to increase the cycles-to-failure of the coating by at least about 10% compared to the same coating without the added microwave-produced carbon black, when tested for weathering according to ASTM D 4799-00."

U.S. Pat. No. 6,562,119 also discloses that "Conventional carbon black has been tested numerous times to determine if its addition improves the weathering of asphalt-based coating materials, and uniformly it has not shown an improvement in weathering when testing the coating material using the Weatherometer test (ASTM Test Method D 4799-00). However, unlike conventional carbon black, it has been discovered that the addition of even a small amount of microwave-produced carbon black to a bituminous coating material substantially improves its weathering under this test."

U.S. Pat. No. 6,562,119 also discloses that "In the method of the present invention, microwave-produced carbon black is added to a bituminous coating material in an amount sufficient to increase the cycles-to-failure of the coating material by at least about 10% compared to the same coating material without the added microwave-produced carbon black, and preferably at least about 15%. The cycles-to-failure of the coating material is measured by testing it for weathering according to ASTM D 4799-00, "Standard Test Method for Accelerated Weathering Test Conditions and Procedures for Bituminous Materials (Fluorescent UV and Condensation Method)", published March 2000. Using Cycle A of the test method, the coating material is exposed to cycles of four hours of UV light at 60° C., alternating with fours hours of condensation at 50° C. The cycles are continued until the coating material fails due to cracking as determined by ASTM Test Method D 1670."

ASTM Standard D 4798-04 uses shingle specimens that are 2.75 inches×5.875 inches. These shingle specimens preferably are subjected to "Cycle A," in which they are exposed to multiple 24 hour cycles of exposure to (i) high intensity Xenon-Arc light, (ii) a combination of high intensity Xenon-Arc light exposure with water spray and (iii) cooling (see Practices G151 and G155) at 60 degrees Celsius A multiplicity of such shingle specimens are used in the test. After a defined number of cycles, one of the weathered specimens is removed, examined for any signs of cracking or failure in accordance with ASTM D 1670 and then subjected to the tear test set forth in ASTM D 3462-05. If the specimen passes the tear test, the remaining specimens are then subjected to additional weathering cycles, after which one of the specimens is again removed, examined for signs of cracking or failure and subjected to the tear test. Failure is defined by the number of cycles required to have a weathered specimen exhibit cracking or fail the tear test.

It is preferred that the shingles of this invention can be subjected to at least 10 cycles of weathering before they fail. In one embodiment, the shingles are subjected to at least 15 cycles of weathering before they fail. In another embodiment, the shingles are subjected to at least 20 cycles of weathering before they fail. In another embodiment, the shingles are subjected to at least 30 cycles of weathering before they fail.

Decrease of the Decline in Tear Resistance

In one preferred embodiment, applicants' shingle loses its tear resistance at a slower rate than do prior art shingles with comparable levels of mineral filler and asphalt. One can conduct the aforementioned weathering tests with both applicants' shingles and prior art shingles with comparable materials and loadings. Applicants' shingles will survive more cycles of weathering prior to failure. Furthermore, although they will also lose some tear resistance, at any particular level of weathering, the rate of loss of tear resistance for applicants' shingles will generally be lower than the rate of loss of tear resistance for prior art shingles. This can readily be indicated by plots of tear resistance over time; the slope of the plots for applicants' shingles will generally be lower.

Thus, unlike prior art shingles, which tend to fail relatively quickly after being put into use, applicants' novel shingle has durable properties that allows it use for an extended period at an acceptable level of performance.

Decrease in Decline of Fastener Pull Through Resistance.

ASTM standard D 3462-05, in section 8.1.11, specifies tests for determining "Fastener Pull-Through Resistance." When the test is conducted at a temperature of from about 21 to about 25 degrees Celsius, a single-layer shingle must have a pull through resistance of at least about 90 Newton's, and a multi-layer product must have a pull-through resistance of at least about 135 Newton's. When the test is conducted at a temperature of from about minus 2 degrees Celsius to about plus 2 degrees Celsius, a single-layer shingle must have a pull through resistance of at least about 104 Newton's, and a multi-layer product must have a pull-through resistance of at least about 180 Newton's. Both conditions must be met in order for a shingle to pass this ATSM standard test.

In one embodiment, after each ten cycles of weathering, two of the weathered samples are tested for fastener pull through resistance, one at each temperature.

In one preferred embodiment, applicants' shingle loses its fastener pull through resistance at a slower rate than do prior art shingles with comparable levels of mineral filler and asphalt.

One can conduct the aforementioned weathering tests with both applicants' shingles and prior art shingles with comparable materials and loadings. Applicants' shingles will survive more cycles of weathering prior to failure. Furthermore, although they will also lose some fastener pull through resistance, at any particular level of weathering, the rate of loss of fastener pull through resistance for applicants' shingles will generally be lower than the rate of loss of fastener pull through resistance for prior art shingles. This can readily be indicated by plots of fastener pull through resistance over time; the slope of the plots for applicants' shingles will generally be lower.

Decline in the Decrease of Adhesion Between the Granules and the Shingle Composition In one preferred embodiment, the decline in granule adhesion in applicant's shingles is less than that occurs in prior art shingles.

Granule adhesion may be measured by ASTM test D 4977-03, "Standard Test Method for Granule Adhesion to Mineral Surfaced Roofing by Abrasion." If more than one gram of the granules is lost, the sample fails the test.

In one embodiment, after each cycle of weathering, one of the weathered samples is tested for granule adhesion.

In one preferred embodiment, applicants' shingle loses its granule adhesion at a slower rate than do prior art shingles with comparable levels of mineral filler and asphalt.

One can conduct the aforementioned weathering tests with both applicants' shingles and prior art shingles with comparable materials and loadings. Applicant's shingles will survive more cycles of weathering prior to failure. Furthermore, although they will also lose some granule adhesion, at any particular level of weathering, the rate of loss of granule adhesion will generally be lower than the rate of loss of granule adhesion for prior art shingles. This can readily be indicated by plots of granule adhesion over time; the slope of the plots for applicants' shingles will generally be lower.

An Impact-Resistant Roofing Shingle

In one embodiment of the invention, applicants provide an impact resistant roofing shingle that passes Underwriter Laboratories Standard Test UL 2218. This test is disclosed in published United States patent application US 2005/0130519, the entire disclosure of which is hereby incorporated by reference into this specification.

In column 1 of such published United States patent application, it is disclosed that "Losses sustained to building roofs caused by climatic conditions such as hailstones has focused development of roofing shingles having increased impact resistance. This need in the art is particularly acute in those geographic areas which are subject to these climatic conditions. Specifically, such areas as the Plain and Rocky Mountain states are particularly subject to roofing damage caused by hailstorms and the like. Indeed, the insurance laws of the state of Texas provide cash rebates to 'homeowners insurance policies wherein the insured property's roof employs Class 4 roof covering materials."

United States published patent application US 2005/013519 also discloses that "The most recognized criteria for impact resistant roof covering materials is provided by Underwriters Laboratory Standard Test UL 2218, which is incorporated by reference. Standard Test UL 2218 categorizes roof covering materials as Class 1, 2, 3 or 4. Class 1 is the category assigned to the least resistant while Class 4 provides the highest recognized impact resistant."

United States published patent application US 2005/013519 also discloses that "Impact resistant roofing materials are known in the art. For example, U.S. Pat. No. 6,228,785 discloses an asphalt-based roofing material which includes a substrate coated with an asphalt coating in which a surface layer of granules is embedded in its top surface. The bottom surface, covered with an asphalt coating, however, is bonded to a web. The bond between the asphalt coating and the web is effectuated by fusing of the asphalt coating and the web. This is achieved by intermingling, caused by melting, of the web and the asphalt coating."

United States published patent application US 2005/013519 also discloses that "U.S. Pat. No. 5,571,596 describes an asphalt-coated roofing shingle, which includes an upper layer of a directional fiber such as Kevlar fabric, a middle layer of fibrous mat material, such as a glass fiber mat, and a lower layer of a directional fiber such as E-glass fabric. Unlike the teaching of the aforementioned '785 patent, wherein the web, fused to the lower region of the asphalt coating, provides impact resistance, the impact resistance of the roofing shingle of the '596 patent is ascribed to the lower layer of directional fiber."

United States published patent application US 2005/013519 also discloses that "A third impact resistant roofing shingle is set forth in U.S. Pat. No. 5,822,943. The laminated roofing shingle of the '943 patent includes an upper layer of a scrim bonded, by means of an adhesive, to a lower layer mat. The preferred adhesive of the upper and lower layers is a rubber binder."

United States published patent application US 2005/013519 also discloses that "In addition to the aforementioned impact resisting roofing material designs, it is well known in the art to modify the asphalt coatings of roofing materials with polymer-type modifiers. Such designs, although effective in theory, have not been very effective in resisting climatic impacts caused by hailstones and the like. On the other hand, modifying the asphalt with polymer-type additives increases the asphalt coating raw material cost. In addition, installation of modified asphalt is more difficult than standard unmodified asphalt coated roofing materials."

United States published patent application US 2005/013519 also discloses that "The above remarks establish the need in the art for a new type of impact resistant roofing shingle that meets the most stringent impact resistant, e.g. Class 4 as defined in UL 2218, yet is simple in design and easy to manufacture."

Applicants' roofing shingle, in one embodiment thereof, is " . . . a new type of impact resistance roofing shingle that . . . ," is at least Class 1 and, more preferably, at least Class 2. In one embodiment, applicants' roofing shingle is at least Class 3. In another embodiment, applicants' shingle is at least Class 4.

Without wishing to be bound to any particular theory, applicants believe that their roofing shingles provide improved impact resistance because the combination of the treated limestone or treated mineral filler with an oxidized roofing asphalt coating creates compound synergy and therefore stronger composition when incorporated into a glass mat and covered with roofing granules as previously described herein.

A Flame-Retarded Roofing Composition

In one preferred embodiment, the roofing composition of this invention, in addition to containing the aforementioned mineral filler, also contains a flame-retarded asphaltic composition with which the mineral filler is mixed prior to the time it is used to impregnate the glass felt.

One may use any of the flame-retarded asphalt compositions known to those in the art including, e.g., those disclosed in U.S. Pat. Nos. 4,804,696 (flame retardant asphalt composition), 5,026,747 (flame retardant asphalt composition), 5,102,463 (flame retardant asphalt composition), 5,168,817 (flame retardant modified asphalt-based material), and the like. The entire disclosure of each of these United States patents is hereby incorporated by reference into this specification.

By way of illustration, and as is disclosed in U.S. Pat. No. 5,168,817, "To impart flame retardancy, it is known to add halogenated olefinic elastomers, fillers such as antimony trioxide, decabromo diphenyl oxide, chlorinated alicyclic hydrocarbon, alumina trihydrate, and chlorinated or brominated paraffins, as is discussed in U.S. Pat. Nos. 4,839,412 and 4,851,463. More specifically, others have attempted to impart flame retardancy to asphalt compositions containing vinyl copolymers by the addition of monoammonium phosphate, ammonium sulfate and methyl hydrogen polysiloxane as in U.S. Pat. No. 4,804,696; by the addition of potassium citrate and methyl hydrogen polysiloxane as in U.S. Pat. No. 5,026,747; by the addition of brominated diphenyl ether, antimony oxide and zinc borate as in U.S. Pat. No. 5,100,715; by the addition of ammonium sulfate, methyl hydrogen polysiloxane, muscovite mica and magnesium silicate as in U.S. Pat. No. 5,102,463; by the addition of colemanite as in U.S. Pat. No. 5,110,674; and by the addition of at least one halogenated flame retardant and at least one inorganic phosphorus containing compound as in U.S. Pat. No. 4,659,381."

Applicants have found that the use of such flame-retarded asphalt in their roofing compositions and the shingles made therefrom imparts excellent and durable flame retardant properties.

An Algae-Resistant Roofing Composition

By way of illustration, and as is disclosed in U.S. Pat. No. 5,427,793, "Discoloration of roofing shingles and other building materials due to algae infestation, has become especially problematic in recent years. Though the phenomena has traditionally been observed in the south and northwest portions of the United States, its presence has been observed in most areas of the country. Typically, the discoloration is found on the northern slope of a roof where moisture is retained. The infestation may be particularly acute on asphalt shingles. Discoloration is attributed to the presence of blue-green algae, *Gloeocapsa magma*, transported through airborne particles. The increased use of calcium carbonate as an asphalt filler in the asphalt shingle manufacturing process is partially responsible for sustained algae growth. Calcium is a macronutrient for *Gloeocapsa magma*, thus the use of limestone filler provides an unlimited food supply in which the algae can feed. *Gloeocapsa magma* is a fairly robust strain of algae which is able to tolerate a variety of climates due to the desiccation properties of the gelatinous sheath surrounding the algae cells."

In one preferred embodiment, the roofing composition of this invention, in addition to containing the aforementioned mineral filler, also contains a biocidal component in which the mineral filler is mixed with a biocidal agent prior to mixing with the asphalt coating and prior to the time it is used to impregnate the glass felt.

In this embodiment, the biocide may consist of organosilane quaternary ammonium compounds, substituted amines or tin-acrylate polymers.

Applicants have found that the use of such biocide treated filler in their roofing compositions and the shingles made therefrom imparts excellent resistance to algae growth on the shingles made therefrom.

The Viscosity Index of the Particles of this Invention

Applicants have discovered that the particles of their invention, when used in a specified asphaltic coating composition, provides a viscosity for such composition that is at least ten percent lower than the viscosity of a comparable composition made from prior art filler particles.

The viscosity index of the particles of the invention is determined by a test in which a standard asphalt composition is used. The asphalt used in this test has a softening point of 97 degrees Fahrenheit, a needle penetration (at 32 degrees Fahrenheit) of 67 decimillimeters, and a viscosity (at 210 degrees Fahrenheit) of 565 centipoise and a flash point of 640 degrees Fahrenheit. Such asphalt is commercially available and may be purchased from, e.g., the BP Amoco Corporation (of Whiting, Ind.) as "Roofing Flux."

In the viscosity index test, standard limestone filler such as Franklin Industrial Minerals Grade $^{85}/_{200}$ is used.

In the viscosity index test, two separate mixtures of asphalt and limestone filler are prepared, each at a loading of 65 weight percent of the filler (by weight of the asphalt and the filler). In this test, the asphalt is heated to a temperature of 250 degrees Fahrenheit and, thereafter, the limestone filler is added to the hot asphalt with mixing until a substantially homogeneous mixture is prepared. One might use a mixer such as the SandTurb or the Turbulizer mixers, both from Bepex Corp. of Rolling Meadows, Ill., both of which comprise a high speed intensive mixer or impeller rotating within a housing.

Once the substantially homogeneous mixture has been prepared, its viscosity is measured using a Brookfield Thermosel system for measuring at elevated temperatures. Viscosities of the filled asphalt coating containing relatively high levels of filler loading are measured over a range of temperatures reflecting the temperatures encountered on roofing machines, i.e. from 425 degrees Fahrenheit to 475 degrees Fahrenheit.

Applicants have discovered that the viscosity of the hot filled asphalt composition made using the particles of their invention is at least about ten percent lower than the viscosity of the hot filled asphalt composition made using the specified particles of the prior art. The ratio of the initial viscosity of the composition made using this invention to the second viscosity of the composition using prior art is preferably less than 0.9 and, in one embodiment, is less than about 0.86; this ratio is the "viscosity index."

In one embodiment, the particles of this invention have a contact angle index of least about 1.1 and, more preferably, at least about 1.2. The contact angle index is the contact angle of the particles of this invention divided by the contact angle of the "standard filler" described hereinabove with reference to the viscosity index test. Such a contact angle may be measured by means well known to those skilled in the art. Reference may be had to U.S. Pat. Nos. 5,861,946 (contact angle measurements of a substrate), 5,423,218 (instrument for measuring contact angle), 5,080,484 (method of measuring contact angle of wetting liquid on a solid surface), 4,688,938 (method and apparatus for determining the contact angle of a drop of liquid placed on a solid or liquid horizontal substrate), 3,696,665 (contact angle measurement of plastic surfaces), and the like. The entire disclosure of each of these United States patents is hereby incorporated by reference into this specification.

In one embodiment, the particles of this invention have a specified particles size distribution. It is preferred that at least 25 weight percent of such particles are within the range of sizes 3.35 millimeters to 212 microns. In one aspect of this embodiment, at least about 50 weight percent of such particles are within such range and, more preferably, at least about 75 weight percent of such particles are within such range.

In one embodiment, the particles of this invention have a specified particles size distribution. It is preferred that at least 25 weight percent of such particles are within the range of sizes 3.35 millimeters to 212 microns. In one aspect of this embodiment, at least about 50 weight percent of such particles are within such range and, more preferably, at least about 75 weight percent of such particles are within such range.

In one embodiment, it is preferred that at least 25 weight percent of such particles are within the range of sizes from 1.0 millimeter to 212 microns. In one aspect of this embodiment, at least about 50 weight percent of such particles are within such range and, more preferably, at least about 75 weight percent of such particles are within such range.

In one embodiment, it is preferred that at least 85 weight percent of such particles are smaller than 212 microns.

In one embodiment, at least 25 weight percent of such particles are smaller than 149 microns.

In one embodiment, some but not all of the particles are coated with an organic coating. In one aspect of this embodiment, at least 80 weight percent of the particles that are smaller than 100 microns are coated with such organic coating, and less than about 10 weight percent of the particles that are bigger than 150 microns are coated with such organic coating.

In one embodiment, some but not all of the particles are coated with an organic coating. In one aspect of this embodiment, at least 65 weight percent of the particles that are smaller than 75 microns are coated with such organic coating, and less than about 15 weight percent of the particles that are bigger than 150 microns are coated with such organic coating.

In one embodiment, at least 65 weight percent of said particles are coated with such organic coating and, more preferably, at least about 75 weight percent of said particles are coated with said organic coating.

In one embodiment, some but not all of the particles are coated with an organic coating. In one aspect of this embodiment, at least 50 weight percent of the particles that are smaller than 50 microns are coated with such organic coating, and less than about 10 weight percent of the particles that are bigger than 100 microns are coated with such organic coating.

In one embodiment, the organic coating is comprised of an organic amine. The organic amine may be a cationic substance, an alkyl amine, alkylene-diamine, etc.

Use of Uncoated Particles with Treated Asphalt.

In one preferred embodiment, an oxidized asphalt coating is treated with an organic anti-strip agent prior to the time it is blended with the filler. U.S. Pat. No. 4,721,529 discloses an asphalt composition that comprises anti-strip agents. Use this, and mix it with uncoated limestone filler as an alternative to the coated filler earlier discussed in some detail.

Use of Treated Filler in Polymer Modified Asphalt Membranes

In one preferred embodiment, a treated limestone filler composition is added to a non-oxidized asphalt and polymer composition to manufacture a lower cost modified bitumen roofing membrane for use on commercial roofing projects or as self sticking sealing membranes such as may be used under roofing shingles as ice and water shield membrane. The use of applicants' composition allows one to increase the "filler loading" in the modified asphalt. The inorganic filler used in such compositions is typically much cheaper than the asphalt or polymer component; and an increase in the "filler loading" with a concomitant decrease in the "modified asphalt loading" substantially reduces the cost of producing such filled composition while not adversely affecting the properties of the roofing membranes made from such modified asphalt. In this embodiment, the filler loading for such membrane compositions can be increased by at least 10 percent and preferably by as much as 25 percent with no loss of durability or strength characteristics.

Use of Treated Filler in Asphalt Adhesives and Crack Fillers

In one preferred embodiment, a treated limestone filler composition is added to a non-oxidized asphalt or non-oxidized asphalt and polymer composition to manufacture an adhesive composition for various commercial uses. The use of applicants' composition allows one to increase the "filler loading" in the modified adhesive. The inorganic filler used in such compositions is typically much cheaper than the asphalt or polymer component; and an increase in the "filler loading" with a concomitant decrease in the "asphalt loading" substantially reduces the cost of producing such filled composition while not adversely affecting the properties of the adhesive membranes made from such composition. In this embodiment, the filler loading for such adhesive compositions can be increased by at least 10 percent and preferably by as much as 25 percent with no loss of tack, durability or strength characteristics.

We claim:

1. A composition comprised of asphalt and filler, wherein said filler is comprised of particles that comprise an inorganic core and a coating disposed on said core, wherein at least about 60 weight percent of said particles are smaller than about 212 microns, and wherein:
   (a) at least 95 weight percent of said filler is comprised of particles of calcium carbonate;
   (b) said composition, at a temperature of from about 425 to about 475 degrees Fahrenheit, has a viscosity of from about 2000 to about 4500 centipoise;
   (c) said asphalt has a flash point of less than 540 degrees Fahrenheit;
   (d) said coating is comprised of an amine anti-strip agent;
   (e) said particles of calcium carbonate are comprised of particles of calcium carbonate that are smaller than 100 microns;
   (f) said particles of calcium carbonate are comprised of particles of calcium carbonate that are larger than 150 microns;
   (g) at least 80 weight percent of said particles of calcium carbonate that are smaller than 100 microns are coated with said coating comprised of said amine anti-strip agent; and
   (h) less than 10 weight percent of said particles of calcium carbonate that are larger than 150 microns are coated with said coating comprised of said amine anti-strip agent.

2. The composition as recited in claim 1, wherein said composition is comprised of from about 71 to about 75 weight percent of said particles of calcium carbonate.

3. The composition as recited in claim 1, wherein said amine anti-strip agent is comprised of a polyamine.

4. The composition as recited in claim 3, wherein said polyamine is an epoxylated polyamine.

* * * * *